(12) United States Patent
Fang

(10) Patent No.: US 11,080,221 B2
(45) Date of Patent: Aug. 3, 2021

(54) SWITCHING DEVICE, PERIPHERAL COMPONENT INTERCONNECT EXPRESS SYSTEM, AND METHOD FOR INITIALIZING PERIPHERAL COMPONENT INTERCONNECT EXPRESS SYSTEM

(71) Applicant: Huawei Technologies Co., Ltd., Shenzhen (CN)

(72) Inventor: Hongcan Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/024,181

(22) Filed: Sep. 17, 2020

(65) Prior Publication Data

US 2021/0004343 A1 Jan. 7, 2021

Related U.S. Application Data

(63) Continuation of application No. 15/799,399, filed on Oct. 31, 2017, now Pat. No. 10,810,151, which is a (Continued)

(30) Foreign Application Priority Data

Jan. 13, 2016 (CN) .......................... 201610022697.1

(51) Int. Cl.
*G06F 13/40* (2006.01)
*G06F 13/38* (2006.01)
(Continued)

(52) U.S. Cl.
CPC ........ *G06F 13/4022* (2013.01); *G06F 13/385* (2013.01); *G06F 13/4027* (2013.01);
(Continued)

(58) Field of Classification Search
CPC ............... G06F 13/4022; G06F 13/385; G06F 13/4027; G06F 13/4221; G06F 2213/0026;
(Continued)

(56) References Cited

U.S. PATENT DOCUMENTS 7,729,284 B2 6/2010 Ukrainetz et al.
9,336,173 B1 5/2016 Sodke et al.
(Continued)

FOREIGN PATENT DOCUMENTS

CN 102707991 A 10/2012
CN 102722414 A 10/2012
(Continued)

*Primary Examiner* — Joe Chacko
(74) *Attorney, Agent, or Firm* — Conley Rose, P.C.

(57) ABSTRACT

A switching system includes a first switching device and a second switching device. The first switching device and the second switching device are coupled using a network. The first switching device includes a plurality of PCIe upstream ports configured to connect to at least one host, the second switching device comprises at least one PCIe downstream port configured to connect to at least one input/output (I/O) device, and the second switching device is configured to receive a first data packet from the first switching device using the network, convert the first data packet to a second data packet complying with a PCIe protocol, and transmit the second data packet to a target I/O device of the second data packet.

20 Claims, 10 Drawing Sheets

Related U.S. Application Data continuation of application No. PCT/CN2017/071081, filed on Jan. 13, 2017.

(51) Int. Cl.
  *G06F 13/42* (2006.01)
  *H04L 12/46* (2006.01)
  *H04L 12/24* (2006.01)
  *H04L 12/741* (2013.01)
  *H04L 12/931* (2013.01)

(52) U.S. Cl.
  CPC ...... *G06F 13/4221* (2013.01); *H04L 12/4633* (2013.01); *H04L 41/0806* (2013.01); *H04L 45/745* (2013.01); *H04L 49/35* (2013.01); *G06F 2213/0026* (2013.01)

(58) Field of Classification Search
  CPC . H04L 12/463; H04L 41/0806; H04L 45/745; H04L 49/35; H04L 49/102; H04L 49/30
  See application file for complete search history.

(56) References Cited

U.S. PATENT DOCUMENTS

| | | |
|---|---|---|
| 2004/0260842 A1 | 12/2004 | Pettey et al. |
| 2011/0119423 A1 | 5/2011 | Kishore et al. |
| 2011/0219164 A1 | 9/2011 | Suzuki et al. |
| 2012/0066428 A1 | 3/2012 | Miyoshi |
| 2012/0110233 A1 | 5/2012 | Higuchi et al. |
| 2012/0173804 A1 | 7/2012 | Gorobets |
| 2012/0179804 A1 | 7/2012 | Katanp et al. |
| 2013/0103866 A1 | 4/2013 | Gao et al. |
| 2013/0111082 A1 | 5/2013 | Baba et al. |
| 2013/0227093 A1 | 8/2013 | Maitra |
| 2013/0268713 A1 | 10/2013 | Choi |
| 2013/0332634 A1 | 12/2013 | Glaser |
| 2014/0181354 A1* | 6/2014 | Yi ............... G06F 13/4022 710/313 |
| 2014/0331223 A1 | 11/2014 | Lee et al. |
| 2015/0254200 A1* | 9/2015 | McGlone ............ G06F 1/3278 710/316 |
| 2015/0334053 A1 | 11/2015 | Fenkes et al. |
| 2016/0294709 A1* | 10/2016 | Xu ............... H04L 45/745 |

FOREIGN PATENT DOCUMENTS

| | | |
|---|---|---|
| CN | 103023824 A | 4/2013 |
| CN | 103117929 A | 5/2013 |
| CN | 103701710 A | 4/2014 |
| CN | 105721357 A | 6/2016 |
| EP | 2549716 A1 | 1/2013 |
| JP | 2010079816 A | 4/2010 |
| JP | 2012059064 A | 3/2012 |
| WO | 2009025381 A1 | 2/2009 |
| WO | 2011004548 A1 | 1/2011 |

* cited by examiner

SWITCHING DEVICE, PERIPHERAL COMPONENT INTERCONNECT EXPRESS SYSTEM, AND METHOD FOR INITIALIZING PERIPHERAL COMPONENT INTERCONNECT EXPRESS SYSTEM

CROSS-REFERENCE TO RELATED APPLICATIONS

This is a continuation of U.S. patent application Ser. No. 15/799,399 filed on Oct. 31, 2017, which is a continuation of Int'l Patent App. No. PCT/CN2017/071081 filed on Jan. 13, 2017, which claims priority to Chinese Patent App. No. 201610022697.1 filed on Jan. 13, 2016, all of which are incorporated by reference.

TECHNICAL FIELD

This application relates to the communications field, and in particular, to a switching device, a Peripheral Component Interconnect Express (PCIe) system, and a method for initializing a PCIe system.

BACKGROUND

A single-root input/output virtualization (SR-IOV) technology proposed by the Peripheral Component Interconnect Special Interest Group (PCI-SIG) is applied to a scenario of sharing an input/output (I/O) device by multiple processes in one host. The SR-IOV technology virtualizes, for a PCIe device, multiple virtual functions (VFs) for an upper-layer host to invoke.

A multi-root input/output virtualization (MR-IOV) technology is applied to a scenario of sharing an I/O device by multiple hosts. The technology virtualizes multiple virtual hierarchies (VH) to be invoked by the multiple hosts, and the multiple VH may be referred to as multiple Peripheral Component Interconnect (PCI) domains. However, the technology modifies protocols of layers except a physical layer and a data link layer in a PCIe protocol. Therefore, multiple nodes, for example, a root node (RN) supporting MR-IOV, a switch, or a PCIe device, in a topology structure need to perform adaption. The MR-IOV technology requires industry chain adaption, causing poor compatibility. At present, there is no product supporting the standard.

A solution of sharing an I/O device by multiple hosts using an SR-IOV device is provided. FIG. 1 shows a typical implementation of the solution. A system 100 includes N hosts (from a host 1 to a host N) 110, a PCIe switch 120, M I/O devices (from an I/O device 1 to an I/O device M) 130, an external management central processing unit (CPU) 140, and a memory 150, where $1 \leq M \leq N$. The management CPU 140 is responsible for performing device enumeration and discovery on an I/O device side, and performing device configuration and management. The PCIe switch 120 includes a non-transparent link (NT-L) module, multiple PCIe upstream ports (designated as UP), a global non-transparent (NT) endpoint (EP) module, and multiple virtual PCIe downstream ports (designated as DP). The global NT EP module is configured to manage a register and map a memory address, and implement a non-transparent virtual (NT-V) function. The system 100 may include multiple VH.

In the technical solution, the management CPU 140 needs to be additionally disposed, the memory 150 corresponding to the management CPU 140 needs to be externally disposed, and a separate PCIe management interface needs to be provided. Consequently, the technical solution is not suitable for a product layout. In addition, in the system 100 shown in FIG. 1, only one management CPU 140 is disposed for managing the entire system 100, and there is only one management link. Once the management link has an exception, an entire network is broken down and cannot be used. Consequently, stability and reliability are relatively poor.

SUMMARY

Embodiments of the present disclosure provide a switching device, a PCIe system, and a method for initializing a PCIe system in order to achieve relatively high stability and reliability.

According to a first aspect, a switching device is provided, including multiple PCIe upstream ports configured to connect to at least one host, at least one PCIe downstream port configured to connect to at least one I/O device, and an internal processing apparatus connected to the at least one PCIe downstream port using an internal connection line of the switching device, where the internal processing apparatus is configured to transmit a configuration read/write packet to the at least one PCIe downstream port using the internal connection line, receive a configuration read/write response packet transmitted by the at least one PCIe downstream port using the internal connection line, where the configuration read/write response packet carries a completer identification (CID), and determine, according to the CID carried in the configuration read/write response packet, that the switching device is connected to an I/O device whose identification is the CID.

The internal processing apparatus may be configured to enumerate a physical device (that is, a real device) connected to the switching device. Optionally, the internal processing apparatus may send multiple configuration read/write packets to the at least one PCIe downstream port, where the multiple configuration read/write packets carry different CIDs. The at least one PCIe downstream port is configured to forward the multiple configuration read/write packets to a physical device connected to the at least one PCIe downstream port, and forward the at least one configuration read/write response packet to the internal processing apparatus when receiving at least one configuration read/write response packet sent by the connected physical device, where the at least one configuration read/write response packet corresponds to at least one of the multiple configuration read/write packets in a one-to-one correspondence, and each configuration read/write response packet carries a CID in a configuration read/write packet corresponding to the configuration read/write response packet. The internal processing apparatus may receive the at least one configuration read/write response packet forwarded by the at least one PCIe downstream port, and determine, according to the CID carried in each of the at least one configuration read/write response packet, the physical device connected to the at least one PCIe downstream port (or the switching device). The physical device may include an I/O device, or may further include a PCIe switch and/or another apparatus.

Therefore, the switching device according to this embodiment of the present disclosure includes the multiple PCIe upstream ports configured to connect to the at least one host, the at least one PCIe downstream port configured to connect to the at least one I/O device, and the internal processing apparatus. The processing apparatus is connected to the at least one PCIe downstream port using the internal connection line, and is configured to transmit a configuration read/write packet to the at least one PCIe downstream port using the internal connection line, receive a configuration read/write response packet transmitted by the at least one PCIe downstream port using the internal connection line, and determine, according to a CID carried in the configuration read/write response packet, that the switching device is connected to an I/O device whose identification (for example, a bus device function (BDF)) is the CID. In this way, when a switching device is faulty, only at least one host and at least one I/O device that are connected to the switching device are affected, and another switching device, and a host and an I/O device that are connected to the other switching device in a system are not affected. Therefore, compared with an external management CPU in the other approaches, stability and reliability of the system can be improved.

In a first possible implementation of the first aspect, if the at least one PCIe downstream port is connected to a single-function I/O device, the switching device is further configured to transparently transmit information between the single-function I/O device and a host corresponding to the single-function I/O device.

In this case, a function of the single-function I/O device can be used only by one of the at least one host, that is, the single-function I/O device corresponds to the host using the function of the single-function I/O device.

With reference to the foregoing possible implementations, in a second possible implementation of the first aspect, the switching device further includes at least one mirroring EP device module configured to store PCIe configuration content of the at least one I/O device connected to the at least one PCIe downstream port, a mapping module configured to implement mapping between a PCIe domain corresponding to the at least one host and a PCIe domain corresponding to the at least one I/O device, and at least one virtual EP device module configured to virtualize a function of the at least one I/O device connected to the at least one PCIe downstream port such that the function is used by the at least one host.

Optionally, one end of the at least one mirroring EP device module is connected to the at least one PCIe downstream port, one end of the at least one virtual EP device module is connected to the multiple PCIe upstream ports, and the mapping module is separately connected to another end of the at least one mirroring EP device module and another end of the at least one virtual EP device module.

Optionally, the mapping module may be configured to implement mapping between the at least one mirroring EP device module and the at least one virtual EP device module, for example, identifications and/or addresses.

With reference to the foregoing possible implementation, in a third possible implementation of the first aspect, a first PCIe downstream port in the at least one PCIe downstream port has no PCIe configuration space, and each of the multiple PCIe upstream ports has a PCIe configuration space.

With reference to the foregoing possible implementation, in a fourth possible implementation of the first aspect, the switching device further includes at least one PCIe configuration space corresponding to each of the at least one PCIe downstream port, and the at least one virtual EP device module is connected to the multiple PCIe upstream ports using the at least one PCIe configuration space corresponding to the at least one PCIe downstream port.

With reference to the foregoing possible implementations, in a fifth possible implementation of the first aspect, the mapping module stores a first mapping table, used to store a mapping relationship from an identification in the PCIe domain corresponding to the at least one host to an identification in the PCIe domain corresponding to the at least one I/O device, and a second mapping table, used to store a mapping relationship from the identification in the PCIe domain corresponding to the at least one I/O device to the identification in the PCIe domain corresponding to the at least one host.

Optionally, the first mapping table is used to store a mapping relationship from an identification of the at least one virtual EP device module to an identification of the at least one mirroring EP device module. The second mapping table store a mapping relationship from the identification of the at least one mirroring EP device module to the identification of the at least one virtual EP device module.

Optionally, the mapping module is further configured to implement mapping between the identification of the at least one virtual EP device module and the identification of the at least one mirroring EP device module according to the first mapping table and the second mapping table.

With reference to the foregoing possible implementations, in a sixth possible implementation of the first aspect, a first mirroring EP device module in the at least one mirroring EP device module is a third mapping table, and the third mapping table is used to store a base address register (BAR) address and a BAR size of a VF of a first I/O device in the at least one I/O device, where the first mirroring EP device module is configured to store PCIe configuration content of the first I/O device.

Optionally, the mapping module is configured to implement mapping from an address of the at least one virtual EP device module to an address of the at least one mirroring EP device module according to the third mapping table and the first mapping table.

With reference to the foregoing possible implementations, in a seventh possible implementation of the first aspect, a first virtual EP device module in the at least one virtual EP device module is configured to virtualize a physical function (PF) of a second I/O device in the at least one I/O device such that the PF is used by a first host in the at least one host, where a PF drive of the second I/O device is loaded by a processor of the first host.

With reference to the foregoing possible implementations, in an eighth possible implementation of the first aspect, a second virtual EP device module in the at least one virtual EP device module is configured to virtualize a VF of a third I/O device in the at least one I/O device such that the VF is used by a second host in the at least one host, where a PF drive of the third I/O device is loaded by a management baseboard management controller (BMC) in the at least one host.

With reference to the foregoing possible implementations, in a ninth possible implementation of the first aspect, a third virtual EP device module in the at least one virtual EP device module is configured to virtualize a PF and a VF of a fourth I/O device in the at least one I/O device such that the PF and the VF are used by a third host in the at least one host, where a PF drive of the fourth I/O device is loaded by the management BMC in the at least one host, and a PF drive of the third virtual EP device module is loaded by a processor of the third host.

With reference to the foregoing possible implementations, in a tenth possible implementation of the first aspect, the switching device is a host switching device and an I/O switching device, and the host switching device and the I/O switching device are connected using an Ethernet interface, where the host switching device includes the multiple PCIe upstream ports, and the I/O switching device includes the internal processing apparatus, the at least one virtual EP device module, the mapping module, the at least one mirroring EP device module, and the at least one PCIe downstream port.

With reference to the foregoing possible implementations, in an eleventh possible implementation, the internal processing apparatus is configured to receive an initialization instruction sent by the management BMC in the at least one host, and transmit, according to the initialization instruction, a configuration read/write packet to the at least one PCIe downstream port using the internal connection line, and the internal processing apparatus is further configured to report, to the management BMC, information about an I/O device connected to the switching device after the I/O device connected to the switching device is determined, where the information includes identification information.

Optionally, the internal processing apparatus may be connected to the multiple PCIe upstream ports using the internal connection line, and the internal processing apparatus may further receive, using the multiple PCIe upstream ports, the initialization instruction sent by the management BMC. The internal processing apparatus may transmit the configuration read/write packet to the at least one PCIe downstream port according to the initialization instruction, determine, according to a received configuration read/write response packet, the information about the I/O device connected to the switching device, and report, to the management BMC using the multiple PCIe upstream ports, the information about the I/O device connected to the switching device, where the information may include the identification information (for example, a BDF), or may further include a topology structure (for example, a PCIe structure tree), or the like.

With reference to the foregoing possible implementations, in a twelfth possible implementation of the first aspect, the internal processing apparatus is further configured to receive configuration management information sent by the management BMC in the at least one host, and configure the multiple PCIe upstream ports and the at least one PCIe downstream port according to the configuration management information.

With reference to the foregoing possible implementations, in a thirteenth possible implementation of the first aspect, the internal processing apparatus is further configured to process an exception event and a hot swap event.

According to a second aspect, a PCIe system is provided, including at least one host, the switching device according to any one of the first aspect or the possible implementations of the first aspect, and at least one I/O device, where the at least one host includes a management BMC having a configuration management function.

Optionally, the management BMC may be configured to manage and control configuration of the switching device. For example, the management BMC may be configured to determine at least one of the following configurations a VF corresponding to a PF of the at least one I/O device, the PCIe configuration space corresponding to the at least one PCIe downstream port in the switching device, a connection relationship between the PCIe configuration space corresponding to the at least one PCIe downstream port and the PCIe upstream ports, a VF of the at least one virtual EP device module, a function that can be used by the at least one host, or the like.

In a first possible implementation of the second aspect, a second I/O device in the at least one I/O device has multiple PFs, and the multiple PFs all have no corresponding VF, a first virtual EP device module in the at least one virtual EP device module is configured to virtualize the PFs of the second I/O device such that the PFs are used by a first host in the at least one host, and a processor of the first host is configured to load a PF drive of the second I/O device.

With reference to the foregoing possible implementations, in a second possible implementation of the second aspect, a second virtual EP device module in the at least one virtual EP device module is configured to virtualize a VF of a third I/O device in the at least one I/O device such that the VF is used by a second host in the at least one host, and the management BMC is further configured to load a PF drive of the third I/O device.

With reference to the foregoing possible implementations, in a third possible implementation of the second aspect, a third virtual EP device module in the at least one virtual EP device module is configured to virtualize a PF and a VF of a fourth I/O device in the at least one I/O device such that the PF and the VF are used by a third host in the at least one host. A processor of the third host is configured to load a PF drive of the third virtual EP device module, and the management BMC is further configured to load a PF drive of the fourth I/O device.

With reference to the foregoing possible implementations, in a fourth possible implementation of the second aspect, the system further includes a PCIe switch, and the at least one PCIe downstream port is configured to connect to the at least one I/O device using the PCIe switch.

With reference to the foregoing possible implementations, in a fifth possible implementation of the second aspect, the system further includes a shelf management module (SMM), and the management BMC is further configured to send, to the SMM, networking configuration information of the at least one host, the switching device, and the at least one I/O device.

Optionally, the networking configuration information may include the configuration management information, or may further include other information.

According to a third aspect, another switching device is provided. The switching device includes at least one PCIe upstream port configured to connect to at least one host, at least one PCIe downstream port configured to connect to at least one I/O device, at least one mirroring EP device module connected to the at least one PCIe downstream port and configured to store PCIe configuration content of the at least one I/O device connected to the at least one PCIe downstream port, at least one virtual EP device module connected to the at least one PCIe downstream port and configured to virtualize a function of the at least one I/O device connected to the at least one PCIe downstream port such that the function is used by the at least one host, and a mapping module separately connected to the at least one virtual EP device module and the at least one mirroring EP device module and configured to implement mapping between a PCIe domain corresponding to the at least one host and a PCIe domain corresponding to the at least one I/O device, where a first PCIe downstream port in the at least one PCIe downstream port and a PCIe configuration space corresponding to the first PCIe downstream port are separately disposed in the switching device.

In this way, the PCIe downstream port and the PCIe configuration space corresponding to the PCIe downstream port are separately disposed in order to facilitate increase of a quantity of available ports that are presented to the host, thereby improving resource utilization.

In a first possible implementation of the third aspect, the at least one virtual EP device module is connected to the at least one PCIe upstream port using at least one PCIe configuration space of the first PCIe downstream port.

The switching device may include one or more PCIe configuration spaces of the first PCIe downstream port, and some or all of the at least one virtual EP device module are connected to some or all of the at least one PCIe upstream port using the at least one PCIe configuration space of the first PCIe downstream port.

In this way, the at least one virtual EP device module is connected to the multiple PCIe upstream ports using the at least one PCIe configuration space corresponding to the first PCIe downstream port in order to facilitate increase of a quantity of virtual EP device modules connected to each host, thereby improving system performance.

According to a fourth aspect, another switching device is provided. The switching device includes at least one PCIe upstream port configured to connect to at least one host, at least one PCIe downstream port configured to connect to at least one I/O device, at least one mirroring EP device module connected to the at least one PCIe downstream port and configured to store PCIe configuration content of the at least one I/O device connected to the at least one PCIe downstream port, at least one virtual EP device module connected to the at least one PCIe downstream port and configured to virtualize a function of the at least one I/O device connected to the at least one PCIe downstream port such that the function is used by the at least one host, and a mapping module separately connected to the at least one virtual EP device module and the at least one mirroring EP device module and configured to implement mapping between a PCIe domain corresponding to the at least one host and a PCIe domain corresponding to the at least one I/O device, where the mapping module stores a first mapping table, used to store a mapping relationship from an identification in the PCIe domain corresponding to the at least one host to an identification in the PCIe domain corresponding to the at least one I/O device, and a second mapping table, used to store a mapping relationship from the identification in the PCIe domain corresponding to the at least one I/O device to the identification in the PCIe domain corresponding to the at least one host.

In this way, the mapping relationship between the identification in the PCIe domain corresponding to the host and the identification in the PCIe domain corresponding to the I/O device is stored in a mapping table manner. Compared with the other approaches, this solution can reduce storage space occupied by the mapping module and complexity, and save a system storage resource.

According to a fifth aspect, another switching device is provided. The switching device includes at least one PCIe upstream port configured to connect to at least one host, at least one PCIe downstream port configured to connect to at least one I/O device, at least one mirroring EP device module connected to the at least one PCIe downstream port and configured to store PCIe configuration content of the at least one I/O device connected to the at least one PCIe downstream port, at least one virtual EP device module connected to the at least one PCIe downstream port and configured to virtualize a function of the at least one I/O device connected to the at least one PCIe downstream port such that the function is used by the at least one host, and a mapping module separately connected to the at least one virtual EP device module and the at least one mirroring EP device module and configured to implement mapping between a PCIe domain corresponding to the at least one host and a PCIe domain corresponding to the at least one I/O device, where a first mirroring EP device module in the at least one mirroring EP device module is a third mapping table, and the third mapping table is used to store a BAR address and a BAR size of a VF of a first I/O device in the at least one I/O device, where the first mirroring EP device module is configured to store PCIe configuration content of the first I/O device.

In this way, address information of the VF of the I/O device is stored in a mapping table manner. Compared with the other approaches, this solution can reduce storage space occupied by the mirroring EP device and the switching device, and save a system storage resource.

According to a sixth aspect, a method for initializing a PCIe system is provided and applied to the PCIe system in any one of the second aspect or the possible implementations of the second aspect. The method includes sending, by the management BMC, an initialization instruction to the internal processing apparatus in the switching device, determining, by the internal processing apparatus according to the initialization instruction, an I/O device connected to the switching device, and reporting, to the management BMC, information about the I/O device connected to the switching device, obtaining, by the at least one host, information about a device connected to the at least one host, and loading, by the at least one host according to the information about the device connected to the at least one host, a VF drive and a PF drive of the at least one I/O device.

In a first possible implementation of the sixth aspect, the by the at least one host according to the information about the device connected to the at least one host includes sending, by a first host in the at least one host, a configuration read packet, where the first host is connected to a first PCIe upstream port in multiple PCIe upstream ports of the switching device, receiving, by at least one target virtual EP device module of the switching device using the first PCIe upstream port, the configuration read packet sent by the first host, sending a configuration read response packet to the first host according to the configuration read packet, where the at least one virtual EP device module includes the at least one target virtual EP device module, and each of the at least one target virtual EP device module is connected to the first PCIe upstream port, sending, by the first host, a configuration write packet according to the received configuration read response packet, receiving, by the at least one target virtual EP device module using the first PCIe upstream port, the configuration write packet sent by the first host, forwarding the configuration write packet to at least one target I/O device using at least one first PCIe downstream port in the at least one PCIe downstream port, where the at least one I/O device includes the at least one target I/O device, and the at least one target virtual EP device module is configured to virtualize a function of the at least one target I/O device, receiving, by the at least one target I/O device using the at least one first PCIe downstream port, the configuration write packet forwarded by the at least one target virtual EP device module, sending a configuration write response packet to the switching device according to the received configuration write packet, receiving, by the switching device, the configuration write response packet sent by the at least one target I/O device, forwarding the configuration write response packet to the first host using the first PCIe upstream port, and obtaining, by the first host from the received configuration write response packet, information about the at least one target virtual EP device module connected to the first host.

In a second possible implementation of the sixth aspect, the method further includes obtaining, by the internal processing apparatus of the switching device, the information about the at least one target virtual EP device module from the configuration write packet, and configuring the mapping module of the switching device according to the obtained information about the at least one target virtual EP device module.

With reference to the foregoing possible implementations, in a third possible implementation of the sixth aspect, loading, by the at least one host according to the information about the device connected to the at least one host, a VF drive and a PF drive of the at least one I/O device includes loading, by the management BMC in the at least one host, a PF drive of the second I/O device if a first virtual EP device module in the at least one virtual EP device module is configured to virtualize a VF of a second I/O device in the at least one I/O device.

With reference to the foregoing possible implementations, in a forth possible implementation of the sixth aspect, loading, by the at least one host according to the information about the device connected to the at least one host, a VF drive and a PF drive of the at least one I/O device includes loading, by a processor of a second host in the at least one host, a PF drive of the third I/O device if a second virtual EP device module in the at least one virtual EP device module is configured to virtualize a PF of a third I/O device in the at least one I/O device, where the second virtual EP device module is connected to the second host using the multiple PCIe upstream ports.

DESCRIPTION OF EMBODIMENTS

The following describes the technical solutions in the embodiments of the present disclosure with reference to the accompanying drawings in the embodiments of the present disclosure.

Figure 1:
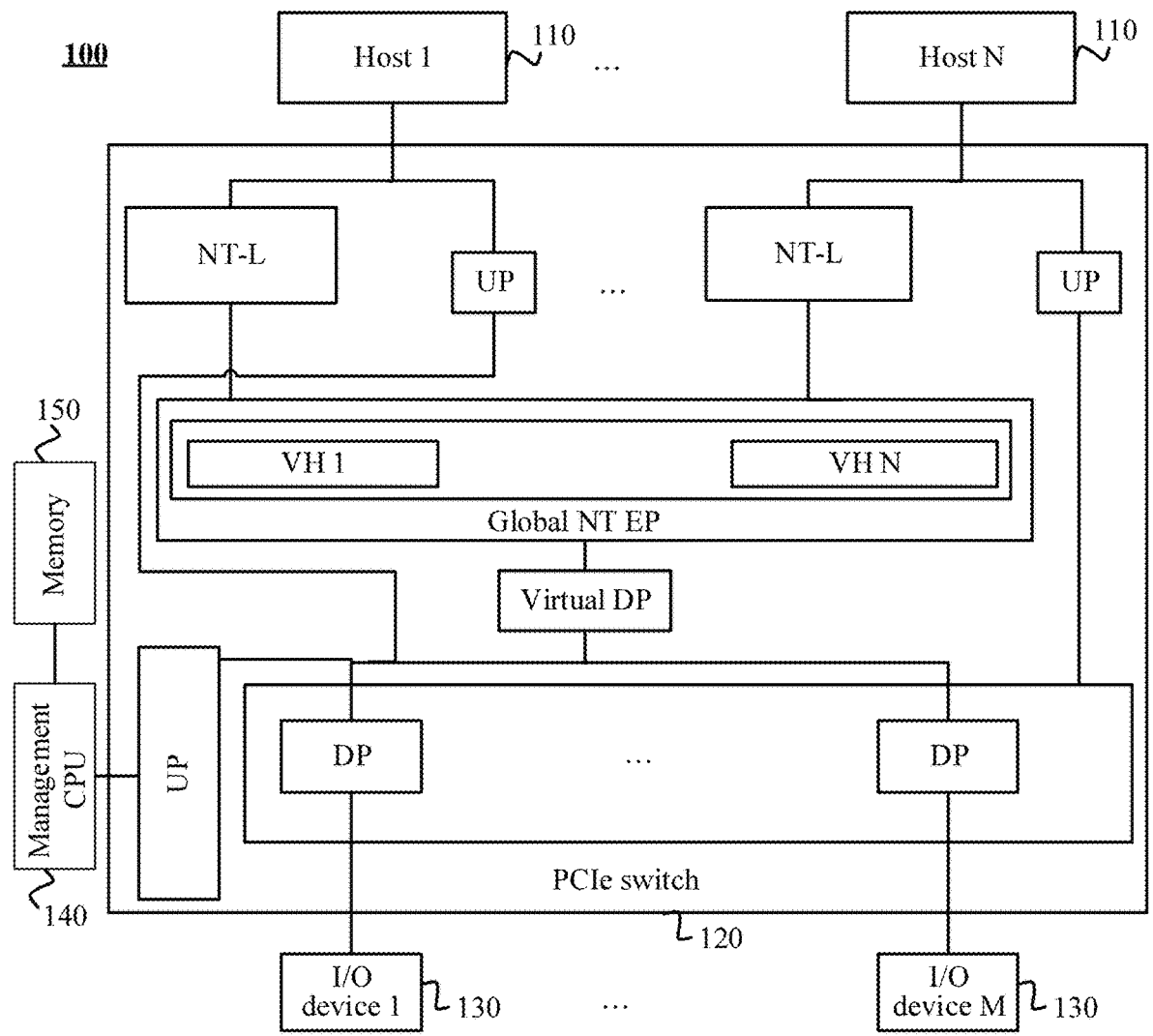
FIG. 1 is a schematic block diagram of a PCIe system.
Figure 2:
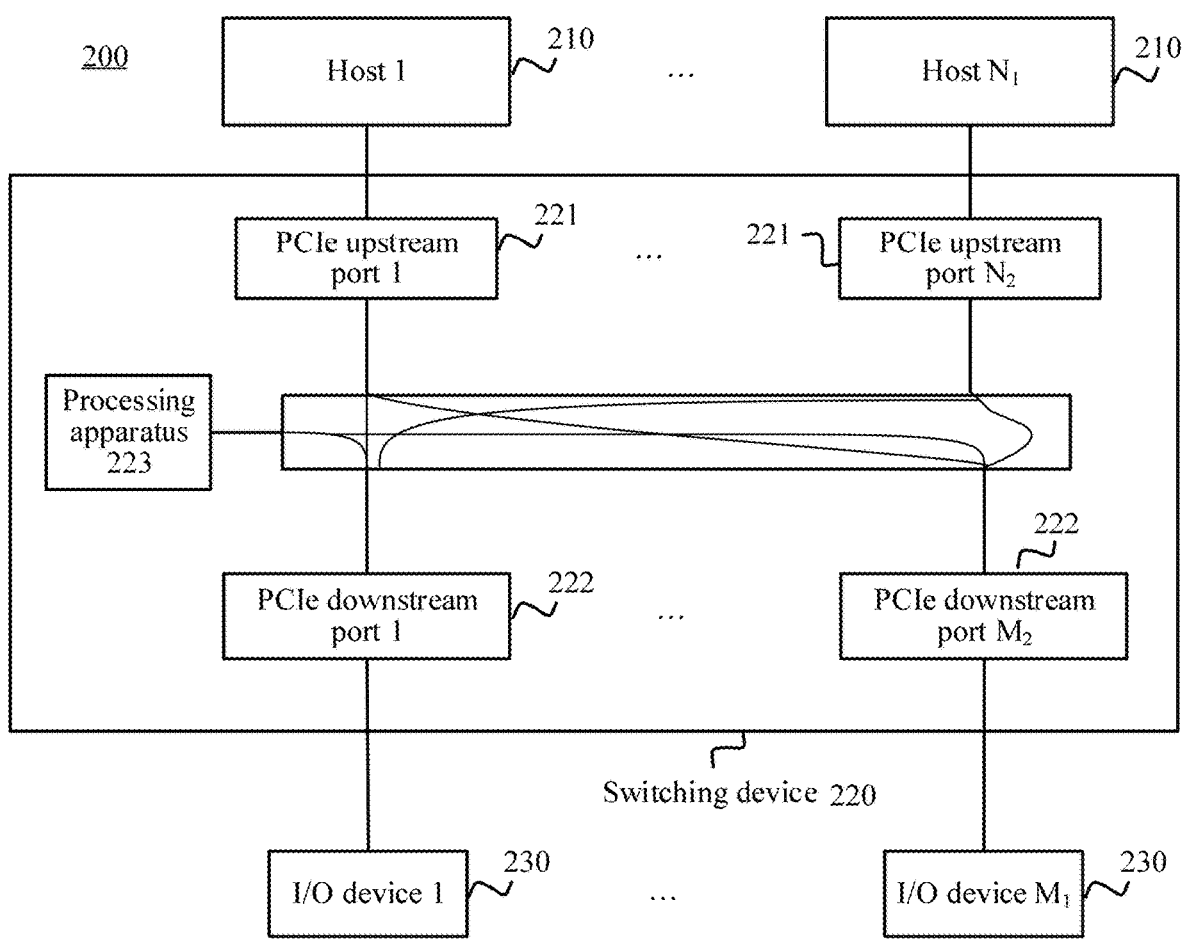
FIG. 2 is a schematic block diagram of a PCIe system according to an embodiment of the present disclosure.

FIG. 2 is a schematic architectural diagram of a PCIe system 200 according to an embodiment of the present disclosure. The PCIe system 200 may be configured to implement sharing an I/O device by multiple processes in one host or implement sharing an I/O device by multiple hosts.

As shown in FIG. 2, the PCIe system 200 includes $N_1$ hosts (designated as Host 1 to Host $N_1$) 210, a switching device 220, and $M_1$ I/O devices (designated as I/O device 1 to I/O device $M_1$) 230, where $N_1 \geq 1$, and $M_1 \geq 1$. The I/O device 230 may also be referred to as an EP device.

FIG. 2 shows, using an example, that the PCIe system 200 includes only one switching device 220, and the switching device 220 is connected to at least one host 210 and at least one I/O device 230. However, it should be understood that the PCIe system 200 may alternatively include multiple switching devices 220, and each switching device 220 may be connected to at least one host 210 and at least one I/O device 230. Each switching device 220 and at least one host 210 and at least one I/O device 230 that are connected to the switching device 220 may be considered as a network unit. Correspondingly, the PCIe system 200 may include one or more network units. However, this is not limited in this embodiment of the present disclosure.

Optionally, in this embodiment of the present disclosure, the host 210 may be a device such as a server or a personal computer. Alternatively, the host 210 may be a virtual machine. This is not limited in this embodiment of the present disclosure. Optionally, some or all of the $N_1$ hosts 210 may include a BMC, that is, the $N_1$ hosts 210 may include one or more BMCs. At least one of the one or more BMCs may have a configuration management function, and is configured to manage and control the network unit including the at least one host 210, the switching device 220, and the at least one I/O device 230. For ease of description, a BMC having a configuration management function is referred to as a management BMC in the following description. Optionally, the management BMC may be configured to implement a configuration management function possessed by a management CPU in the other approaches. However, different from the management CPU in the other approaches, the management BMC may be responsible for only configuration management of the switching device 220, and at least one host 210 and at least one I/O device 230 that are connected to the switching device 220 in a network unit to which the management BMC belongs, but not be responsible for configuration management of hosts 210, I/O devices 230, and switching devices 220 in other network units that may exist in a network. This is not limited in this embodiment of the present disclosure.

Optionally, the I/O device 230 may be a device such as a host bus adapter (HBA) or a solid state disk (SSD). This is not limited in this embodiment of the present disclosure.

In this embodiment of the present disclosure, the switching device 220 may include $N_2$ PCIe upstream ports (designated as PCIe upstream port 1 to PCIe upstream port $N_2$) 221, $M_2$ PCIe downstream ports (designated as PCIe downstream port 1 to PCIe downstream port $M_2$) 222, and an internal processing apparatus 223, where $N_2 \geq 1$, and $M_2 \geq 1$. The $N_2$ PCIe upstream ports 221 are configured to connect to the $N_1$ hosts 210. The $M_2$ PCIe downstream ports 222 are configured to connect to the $M_1$ I/O devices 230. The internal processing apparatus 223 may be connected to the $M_2$ PCIe downstream ports 222 using an internal connection line of the switching device 220, and may be connected to the $N_2$ PCIe upstream ports 221 using the internal connection line of the switching device 220.

Further, the switching device 220 may be connected to the $N_1$ hosts 210 using the $N_2$ PCIe upstream ports 221. If $N_2=N_1$, that is, a quantity of the PCIe upstream ports 221 of the switching device 220 is equal to a quantity of the hosts 210 connected to the switching device 220, the $N_2$ PCIe upstream ports 221 may be connected to the $N_1$ hosts 210 in a one-to-one correspondence. If $N_2 > N_1$, that is, a quantity of the PCIe upstream ports 221 of the switching device 220 is greater than a quantity of the hosts 210 connected to the switching device 220, $N_1$ of the $N_2$ PCIe upstream ports 221 may be connected to the $N_1$ hosts 210 in a one-to-one correspondence, and remaining ($N_2-N_1$) PCIe upstream ports 221 may be idle, or may be set as PCIe downstream ports 222. However, this is not limited in this embodiment of the present disclosure.

Similarly, the switching device 220 may be connected to the $M_1$ I/O devices 230 using the $M_2$ PCIe downstream ports 222. If $M_2 = M_1$, that is, a quantity of the PCIe downstream ports 222 of the switching device 220 is equal to a quantity of the I/O devices 230 connected to the switching device 220, the $M_2$ PCIe downstream ports 222 may be connected to the $M_1$ I/O devices 230 in a one-to-one correspondence. If $M_2 > M_1$, that is, a quantity of the PCIe downstream ports 222 of the switching device 220 is greater than a quantity of the I/O devices 230 connected to the switching device 220, $M_1$ of the $M_2$ PCIe downstream ports 222 may be connected to the $M_1$ I/O devices 230 in a one-to-one correspondence, and remaining ($M_2-M_1$) PCIe downstream ports 222 may be idle or may be set to PCIe upstream ports 221. If $M_2 < M_1$, that is, a quantity of the PCIe downstream ports 222 of the switching device 220 is less than a quantity of the I/O devices 230 connected to the switching device 220, the PCIe system 200 may further include one or more PCIe switches, and some or all of the $M_2$ PCIe downstream ports 222 may be connected to the $M_1$ I/O devices 230 using the PCIe switch. In this way, the quantity of the I/O devices 230 connected to the switching device 220 may be increased, and switching performance is not reduced. However, this is not limited in this embodiment of the present disclosure.

Optionally, the PCIe system 200 further includes the PCIe switch (not shown), and the $M_2$ PCIe downstream ports 222 may be connected to the $M_1$ I/O devices 230 using the PCIe switch.

In addition, the switching device 220 further includes the internal processing apparatus 223. The internal processing apparatus 223 may be a processing module, for example, a processor and/or a hardware processing circuit. Optionally, the internal processing apparatus 223 may be implemented by a processor and a hardware circuit. Alternatively, the internal processing apparatus 223 may be implemented only by a hardware circuit. This is not limited in this embodiment of the present disclosure.

In this embodiment of the present disclosure, the internal processing apparatus 223 may be configured to enumerate a physical device (that is, a real device, including no functional module) connected to the switching device 220, for example, determine a physical device connected to the switching device 220 using the $M_2$ PCIe downstream ports 222, or may further obtain information, for example, an identification (a BDF) or a topology structure, of multiple physical devices connected to the switching device, and may further set up a PCIe domain structure tree according to the information about the multiple physical devices. The physical device may include the I/O device 230 and/or the PCIe switch. In this case, the internal processing apparatus 223 may be considered as a virtual root port (RP) or a root complex (RC). However, this is not limited in this embodiment of the present disclosure.

Optionally, the internal processing apparatus 223 may actively perform device enumeration, for example, perform device enumeration at a system initialization stage. Alternatively, the internal processing apparatus 223 may perform, when receiving an instruction of another device, device enumeration according to the instruction. For example, the internal processing apparatus 223 may receive an initialization instruction or an enumeration instruction that is sent by the management BMC, and perform device enumeration according to the initialization instruction or the enumeration instruction. However, this is not limited in this embodiment of the present disclosure.

Further, when performing device enumeration, the internal processing apparatus 223 may send multiple configuration read/write packets to the at least one PCIe downstream port 222. The configuration read/write packet carries a request identification (RID) and a CID, where a value of the RID may be set to a BDF of the internal processing apparatus 223, and a value of the CID may be numbered in sequence starting from an initial value. The internal processing apparatus 223 may receive a configuration read/write response packet corresponding to at least one of the multiple configuration read/write packets. The configuration read/write response packet carries a RID and a CID in the corresponding configuration read/write packet. In this way, the internal processing apparatus 223 determines, by recognizing the configuration read/write response packet (for example, recognizing the CID in the configuration read/write response packet), whether the switching device 220 is connected to a physical device whose BDF number is the CID in the configuration read/write response packet. However, this is not limited in this embodiment of the present disclosure.

In an optional embodiment, if the internal processing apparatus 223 is implemented by a processor and a hardware circuit, where the processor and the hardware circuit may be connected using an internal bus, the processor may be configured to receive an initialization instruction (or an enumeration instruction) from the management BMC, generate, according to the initialization instruction, information that is about an enumeration packet and that includes information needed by configuration read/write packets of type 0 and type 1, and output the generated information to the internal bus. The hardware circuit may receive, using the internal bus, the information generated by the processor, encapsulate the information as a transaction layer packet (TLP), and send the TLP to the at least one PCIe downstream port 222 using a next-level module or circuit connected to the internal processing apparatus 223. In addition, the hardware circuit may be further configured to recognize a configuration read/write response packet when receiving the configuration read/write response packet sent by the at least one PCIe downstream port 222. For example, the hardware circuit may receive a completion packet without data (CPL)/completion packet with data (CPLD) packet transmitted by the at least one PCIe downstream port 222, and recognize an identification in the received CPL/CPLD packet. By means of interruption trigger of the hardware circuit, the CPL/CPLD packet may be transmitted to the processor of the internal processing apparatus 223 using the internal bus. Further, the hardware circuit may disassemble the CPL/CPLD packet into a data format complying with a time sequence of the internal bus, and send the CPL/CPLD packet to the internal bus. The processor of the internal processing apparatus 223 may be further configured to parse received packet information, store the packet information, and generate a structure tree of a PCIe domain according to the packet information. After the device enumeration is completed, the processor may further transmit information about the generated PCIe structure tree to the management BMC using the multiple PCIe upstream ports 221. However, this is not limited in this embodiment of the present disclosure.

Therefore, the PCIe system 200 provided in this embodiment of the present disclosure includes the at least one host 210, the switching device 220, and the at least one I/O device 230. The switching device 220 includes the multiple PCIe upstream ports 221 configured to connect to the at least one host 210, the at least one PCIe downstream port 222 configured to connect to the at least one I/O device 230, and the internal processing apparatus 223. The processing apparatus 223 is connected to the at least one PCIe downstream port 222 using an internal bus, and is configured to transmit a configuration read/write packet to the at least one PCIe downstream port 222 using the internal connection line, receive a configuration read/write response packet transmitted by the at least one PCIe downstream port 222 using the internal connection line, and determine, according to a CID carried in the configuration read/write response packet, that the switching device 220 is connected to an I/O device 230 whose identification is the CID. In this way, when the switching device 220 in the PCIe system 200 is faulty, only at least one host 210 and at least one I/O device 230 that are connected to the switching device 220 may be affected, and another switching device, and a host and 210 an I/O device 230 that are connected to the other switching device in the PCIe system 200 are not affected. Therefore, compared with an external management CPU in the other approaches, stability and reliability of the PCIe system 200 can be improved.

Optionally, the internal processing apparatus 223 may further have at least one of the functions of hot swap event processing, exception event processing, or component configuration (for example, register configuration).

The internal processing apparatus 223 may be configured to process a hot swap event. Further, the internal processing apparatus 223 may detect a hot swap event triggered by the management BMC and/or hardware, and perform a corresponding hot swap processing procedure. The internal processing apparatus 223 may be further configured to process an exception event. Further, the internal processing apparatus 223 may process a hardware exception, record an exception event log, and report the exception event log. In addition, the internal processing apparatus 223 may be further configured to configure a component. The internal processing apparatus 223 may configure a register at an initialization stage, or modify a configuration of the register. The internal processing apparatus 223 may obtain information needed for the component configuration in a process of device enumeration, or may receive configuration management information sent by the management BMC, configure the component according to the configuration management information, and the like. This is not limited in this embodiment of the present disclosure.

In an optional embodiment, if the internal processing apparatus 223 is implemented by the processor and the hardware circuit, when implementing the function of exception event processing, the hardware circuit in the internal processing apparatus 223 may capture exception information related to a PF of the I/O device, and trigger the processor using interruption information configured by the processor in the internal processing apparatus 223. The processor of the internal processing apparatus 223 may recognize an exception type. If the exception type is a correctable or an uncorrectable nonfatal error, the processor may perform self-processing, and output only an alarm without reporting. If the exception type is an uncorrectable fatal error, the processor may break a link of the I/O device 230, and report the broken link of the I/O device 230 to the management BMC. After learning the I/O device 230 whose link is broken, the management BMC may uninstall a drive corresponding to the I/O device 230. In addition, optionally, the management BMC may notify an SMM of update of networking information. The SMM manages and controls a host 210 corresponding to the I/O device 230 having an exception, for example, performs drive uninstallation or resets initialization processing. This is not limited in this embodiment of the present disclosure.

In this embodiment of the present disclosure, the internal processing apparatus 223 may be configured to receive a data packet sent by the $M_1$ I/O devices 230 using the $M_2$ PCIe downstream ports 222, process the received data packet, for example, convert a time sequence, and send the processed data packet to the $N_2$ PCIe upstream ports 221 using the internal connection line. In addition, the internal processing apparatus 223 may be further configured to receive a data packet sent by the $N_1$ hosts 210 using the $N_2$ PCIe upstream ports 221, process the received data packet, for example, convert a time sequence, and send the processed data packet to the $M_2$ PCIe downstream ports 222 using the internal connection line.

In an optional embodiment, if the internal processing apparatus 223 is implemented by the processor and the hardware circuit, when receiving data sent by the host 210, the processor in the internal processing apparatus 223 may parse a bus time sequence of an interface of the management BMC, and output the data in a time sequence of the internal bus. When receiving data forwarded by a next-level module or circuit, the processor may parse the time sequence of the internal bus, and output the data to a bus of the interface of the management BMC. However, this is not limited in this embodiment of the present disclosure.

Optionally, in this embodiment of the present disclosure, the management BMC may report networking information (or networking configuration information) to the SMM using a network port. The SMM may be configured to be responsible for managing an entire network. A user may set, according to a requirement, a mapping connection between the host and the I/O device using a human-computer interaction interface of the SMM. In this case, optionally, the management BMC may be further configured to receive configuration requirement information sent by the SMM, and determine the configuration management information according to the configuration requirement information. However, this is not limited in this embodiment of the present disclosure.

Optionally, in this embodiment of the present disclosure, each of the $N_2$ PCIe upstream ports 221 has a PCIe configuration space, and none of the $M_2$ PCIe downstream ports 222 has any PCIe configuration space.

In this embodiment of the present disclosure, the PCIe upstream port 221 in the switching device 220 has the PCIe configuration space, and is a standard PCIe port (that is, a standard peer to peer (P2P) upstream bridge). The PCIe downstream port 222 in the switching device 220 has no PCIe configuration space, and is not a standard PCIe port (that is, is not a standard P2P downstream bridge). Optionally, the switching device 220 may not additionally store PCIe configuration spaces of the $M_2$ PCIe downstream ports 222, that is, there is no PCIe configuration space of the PCIe downstream port 222 in the switching device 220. Alternatively, the switching device 220 may additionally store a PCIe configuration space of each of the $M_2$ PCIe downstream ports 222, that is, the PCIe configuration space of the PCIe downstream port 222 is separated from the PCIe downstream port 222 in the switching device 220. Alternatively, the switching device 220 may additionally store PCIe configuration spaces of some of the $M_2$ PCIe downstream ports 222 but not additionally store PCIe configuration spaces of some other PCIe downstream ports 222. This is not limited in this embodiment of the present disclosure.

Optionally, in this embodiment of the present disclosure, the PCIe downstream port 222 may correspond to at least one PCIe configuration space, and the at least one PCIe configuration space corresponding to the PCIe downstream port 222 and the PCIe downstream port 222 may be individually disposed in the switching device 220, that is, the PCIe downstream port 222 may be separated from the at least one PCIe configuration space corresponding to the PCIe downstream port 222. In addition, optionally, the at least one PCIe configuration space corresponding to the PCIe downstream port 222 may belong to a PCIe domain corresponding to the $N_1$ hosts 210. In this way, when the switching device 220 stores multiple PCIe configuration spaces corresponding to a PCIe downstream port 222, the PCIe downstream port 222 may be used as multiple ports to be used by the hosts 210 in order to improve resource utilization of the system.

It should be understood that an example in which the $N_2$ PCIe upstream ports 221 in the switching device 220 all have the PCIe configuration space and the $M_2$ PCIe downstream ports 222 all have no PCIe configuration space is used for description in the foregoing embodiment. Optionally, some of the $M_2$ PCIe downstream ports 222 may have a PCIe configuration space, and some other PCIe downstream ports 222 may have no PCIe configuration space. Alternatively, all of the $M_2$ PCIe downstream ports 222 have a PCIe configuration space. In another optional embodiment, some or all of the $N_2$ PCIe upstream ports 221 may have no PCIe configuration space. This is not limited in this embodiment of the present disclosure.

Figure 3:
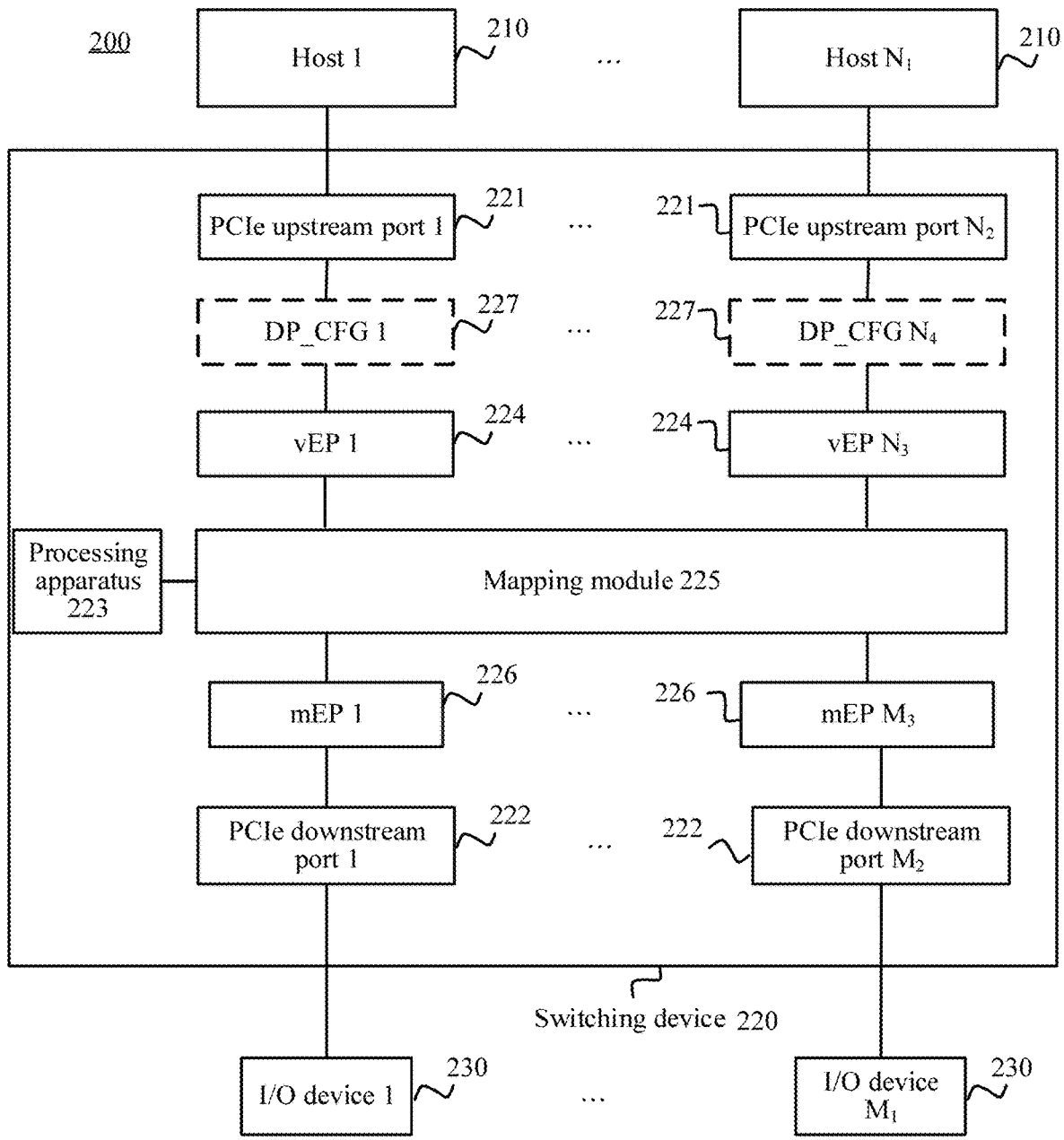
FIG. 3 is another schematic block diagram of a PCIe system according to an embodiment of the present disclosure.

Optionally, as shown in FIG. 3, the switching device 220 further includes $N_3$ virtual EP device modules (designated as vEP 1 to vEP $N_3$) 224, a mapping module 225, and $M_3$ mirroring EP device modules (designated as mEP 1 to mEP $M_3$) 226.

The $N_3$ vEPs 224 may be connected to the $N_2$ PCIe upstream ports 221 and are configured to virtualize functions of the $M_1$ I/O devices 230 connected to the $M_2$ PCIe downstream ports 222 such that the functions are used by the $N_1$ hosts 221 connected to the $N_2$ PCIe upstream ports 221, where $N_3 \geq 1$.

The $M_3$ mEPs 226 may be connected to the $M_2$ PCIe downstream ports 222 and are configured to store PCIe configuration content of the $M_1$ I/O devices 230 connected to the $M_2$ PCIe downstream ports 222, where $M_3 \geq 1$.

The mapping module 225 may be separately connected to the $N_3$ vEPs 224 and the $M_3$ mEPs 226 and configured to implement mapping between a PCIe domain corresponding to the $N_1$ hosts 210 and a PCIe domain corresponding to the $M_1$ I/O devices 230.

In this embodiment of the present disclosure, optionally, the switching device 220 may further include one or more mEPs 226, the mapping module 225, and one or more vEPs 224. A value of $N_3$ may be determined by a quantity of functions that need to be used or can be used by the $N_1$ hosts 210, and $N_3$ may be equal to or not equal to $M_3$. For example, $N_3$ and $M_3$ may both be equal to a total quantity of functions (for example, a total quantity of VFs) possessed by the $M_1$ I/O devices 230. This is not limited in this embodiment of the present disclosure.

Further, the mEP 226 may be mirroring of a real EP and configured to store the PCIe configuration content of the I/O device (that is, the EP device) 230. The vEP 224 may be configured to virtualize a PF and/or a VF of the EP device 230, and may be a PCIe configuration space corresponding to the PF or the VF of the EP device 230. The mapping module 225 may be configured to implement mapping between identifications and/or addresses of the PCIe domain corresponding to the $N_1$ hosts 210 and the PCIe domain corresponding to the at least one I/O device 230 to determine a module (or component) to which received information and/or data is sent. In an optional example, the vEP 224 may belong to the PCIe domain corresponding to the host 210, and the mEP 226 may belong to the PCIe domain corresponding to the I/O device 230. Correspondingly, the mapping module 225 may be configured to implement mapping between an identification and/or address of the $M_3$ mEPs 226 and an identification and/or address of the $N_3$ vEPs 224 (that is, perform mapping from the vEPs 224 to the mEPs 226 or perform mapping from the mEPs 226 to the vEPs 224) in order to perform forwarding processing on a data packet transmitted between the $N_1$ hosts 210 and the $M_1$ I/O devices 230. However, this is not limited in this embodiment of the present disclosure.

Optionally, the $N_2$ PCIe upstream ports 221, the $N_3$ vEPs 224, the mapping module 225, the $M_3$ mEPs 226, and the $M_2$ PCIe downstream ports 222 may be connected in sequence. Further, one end of the vEP 224 may be connected to the PCIe upstream port 221, and another end may be connected to the mapping module 225. The $N_3$ vEPs 224 may be directly or indirectly connected to some or all of the $N_2$ PCIe upstream ports 221. One end of the mEP 226 may be connected to the PCIe downstream port 222, and another end may be connected to the mapping module 225. The $M_3$ mEPs 226 may be directly or indirectly connected to some or all of the $M_2$ PCIe downstream ports 222. However, this is not limited in this embodiment of the present disclosure.

If the PCIe configuration spaces of the $M_2$ PCIe downstream ports 222 are not additionally set in the switching device 220, the $N_3$ vEPs 224 may be directly connected to some or all of the $N_2$ PCIe upstream ports 221. Optionally, if the switching device 220 further additionally stores a PCIe configuration space corresponding to one or more PCIe downstream ports 222, for example, as shown in FIG. 3, the switching device 220 may store $N_4$ PCIe downstream port configuration spaces (designated as DP_CFG 1 to DP_CFG $N_4$) 227, each PCIe downstream port 222 may correspond to zero, one, or more pieces of DP_CFG 227. In this case, the $N_3$ vEPs 224 may be connected to the $N_2$ PCIe upstream ports 221 using the $N_4$ pieces of DP_CFG 227. In this way, the PCIe upstream port 221 is connected to the vEP 224 using the PCIe configuration space corresponding to the PCIe downstream port 222 in order to increase a quantity of vEPs that can be used by each host, thereby enhancing system performance.

In addition, in this embodiment of the present disclosure, a VF is presented to the host 210 such that the PCIe system 200 supports any WINDOWS version to use the VF in the host.

In an optional embodiment, the mapping module 225 stores a first mapping table (not shown), used to store a mapping relationship from an identification in the PCIe domain corresponding to the $N_1$ hosts 210 to an identification in the PCIe domain corresponding to the $M_1$ I/O devices 230, and a second mapping table (not shown), used to store a mapping relationship from the identification in the PCIe domain corresponding to the $M_1$ I/O devices 230 to the identification in the PCIe domain corresponding to the $N_1$ hosts 210.

Optionally, the first mapping table may be used to store a mapping relationship from an identification of the $N_3$ vEPs 224 to an identification of the $M_3$ mEPs 226, for example, a mapping relationship from a BDF number of at least one vEP 224 to a BDF number of at least one mEP 226. The second mapping table may be used to store a mapping relationship from the identification of the $M_3$ mEPs 226 to the identification of the $N_3$ vEPs 224. However, this is not limited in this embodiment of the present disclosure.

Optionally, in this embodiment of the present disclosure, the mapping module 225 may be implemented by a register and a hardware processing circuit. In this case, the first mapping table and the second mapping table may be separately stored by the register. In addition, optionally, the identifications in the first mapping table and the second mapping table may be represented by BDFs. Alternatively, a function of the I/O device 230 or a function of the vEP 224 may be renumbered, for example, be numbered in sequence starting from 1, to obtain an index of each function, and the index is stored in the mapping tables in a function index form, to save storage space.

Table 1 and Table 2 respectively show possible implementations of the first mapping table and the second mapping table. As shown in Table 1, the first mapping table may include four columns. A value in a column of "function index" indicates an index of a function in the PCIe domain corresponding to the I/O device 230. The index may be obtained by numbering BDFs of all functions, and may occupy one or several bits. A value in a column of "enable indication" indicates whether a function corresponding to the function index exists. An mEP bus number and an mEP function number may respectively indicate a bus number and a device function number of an mEP 226 corresponding to the function index. The mEP bus number and the mEP function number are combined into a BDF number of the mEP 226. The BDF number of the mEP 226 may be associated with a BDF number of an I/O device 230 corresponding to the mEP 226. A quantity of rows included in the first mapping table is not limited in this embodiment of the present disclosure. For example, the first mapping table may include 1024 entries. However, this is not limited in this embodiment of the present disclosure.

TABLE 1

Possible Implementation of the First Mapping Table

| Function index | Enable indication (one bit) | mEP bus number (eight bits) | mEP function number |
|---|---|---|---|

As shown in Table 2, the second mapping table may include five columns. A value in a column of "function index" indicates an index (for example, a function index of the vEP 224) of a function in the PCIe domain (which may be a virtual functional module and/or physical device discovered by the host 210 by means of enumeration) corresponding to the host 210. The index may be obtained by numbering BDFs of all functions, and may occupy one or several bits. A value in a column of "enable indication" indicates whether a function corresponding to the function index exists. An enumerated VF (eVF) bus number and an eVF device function number respectively indicate a bus number and a device function number of an eVF 224 corresponding to the function index. The eVF bus number and the eVF device function number are combined into a BDF of the eVF 224. A value in a column of "PF indication" is used to indicate whether the function corresponding to the function index is a VF or a PF. A quantity of rows included in the second mapping table is not limited in this embodiment of the present disclosure. For example, the second mapping table may include 1024 entries. However, this is not limited in this embodiment of the present disclosure.

TABLE 2

Possible Implementation of the Second Mapping Table

| Function index | Enable indication (one bit) | eVF bus number (eight bits) | eVF device function number (eight bits) | PF indication |
|---|---|---|---|---|

In this way, the mapping relationship between the identification in the PCIe domain corresponding to the host 210 and the identification in the PCIe domain corresponding to the I/O device 230 is stored in a mapping table manner. Compared with the other approaches, this solution can reduce storage space occupied by the mapping module 225 and complexity, and save a system storage resource. In addition, the BDFs of all the functions are numbered and the numbers are stored in the mapping table. Compared with storing a BDF of 16 bits, the storage space occupied by the mapping module 225 can be further reduced.

Optionally, in this embodiment of the present disclosure, the PCIe configuration content, of the EP device 230, stored in the mEP 226 may be a PCIe configuration space of the EP device 230, or may be part configuration content in a PCIe configuration space of the EP device 230. For example, all of the $M_3$ mEPs 226 may be mapping tables. Alternatively, some of the $M_3$ mEPs 226 may be mapping tables. This is not limited in this embodiment of the present disclosure.

In an optional embodiment, a first mEP 226 in the M3 mEPs 226 is a third mapping table. The third mapping table is used to store a BAR address and a BAR size of a VF of a first I/O device 230 in the M1 I/O devices 230. The first mEP 226 is configured to store configuration content of the first I/O device 230.

Table 3 shows a possible implementation of the third mapping table. The third mapping table includes an mEP index and a BAR address and a BAR size that correspond to the mEP index. Optionally, each mEP 226 may include six BARs. However, this is not limited in this embodiment of the present disclosure.

TABLE 3

Possible Implementation of the Third Mapping Table

| mEP index | VF BAR0 (32 bits) | . . . | VF BAR5 (32 bits) |
|---|---|---|---|

In this case, the mapping module 225 may implement the mapping from the address in the PCIe domain of the host 210 to the address in the PCIe domain of the I/O device 230 with reference to the third mapping table and the first mapping table. However, this is not limited in this embodiment of the present disclosure.

In this way, address information of the VF of the I/O device 230 is stored in a mapping table manner. Compared with the other approaches, this solution can reduce storage space occupied by the mEP 226, and save a system storage resource.

It should be understood that examples of Table 1 to Table 3 are intended to help a person skilled in the art better understand this embodiment of the present disclosure, but not to limit the scope of this embodiment of the present disclosure. A person skilled in the art may perform various equivalent modifications or changes according to the provided examples of Table 1 to Table 3. The modifications or the changes also fall into the scope of this embodiment of the present disclosure.

Optionally, in this embodiment of the present disclosure, the first mapping table, the second mapping table, or the third mapping table may be jointly configured by the internal processing apparatus 223 in the switching device 220 and the host 210. For example, the internal processing apparatus 223 may obtain, by means of device enumeration or in another manner, information about a physical device connected to the switching device 220 using the $M_1$ PCIe downstream ports 222, and configure the mapping table according to the obtained information, for example, store the information about the physical device in the mapping table. The host 210 may store, in the mapping table, configuration information, of the PCIe domain corresponding to the host 210, obtained in a device enumeration (that is, discovering a physical device and/or a functional module connected to the host 210) process or in another manner. However, this is not limited in this embodiment of the present disclosure.

In addition, the $N_3$ vEPs 224, the mapping module 225, and the $M_3$ mEPs 226 may be implemented by a register or by a register and a hardware circuit, and are simple in use without implementing a PCIe structure tree using software code. In addition, a storage and forwarding process in a software implementation process is avoided using a dual operation of configure write of a virtual device and a real device.

In this embodiment of the present disclosure, the PCIe system 200 may support multiple operation modes. The multiple operation modes may include at least one of a VF direct mode, a VF shared mode, a PF shared mode, or an EP transparent transmission mode. The VF direct mode and the VF shared mode may be applied to an I/O device supporting SR-IOV. The PF shared mode may be applied to an I/O device supporting multiple functions. The EP transparent transmission mode may be applied to a single-function I/O device.

Figure 4:
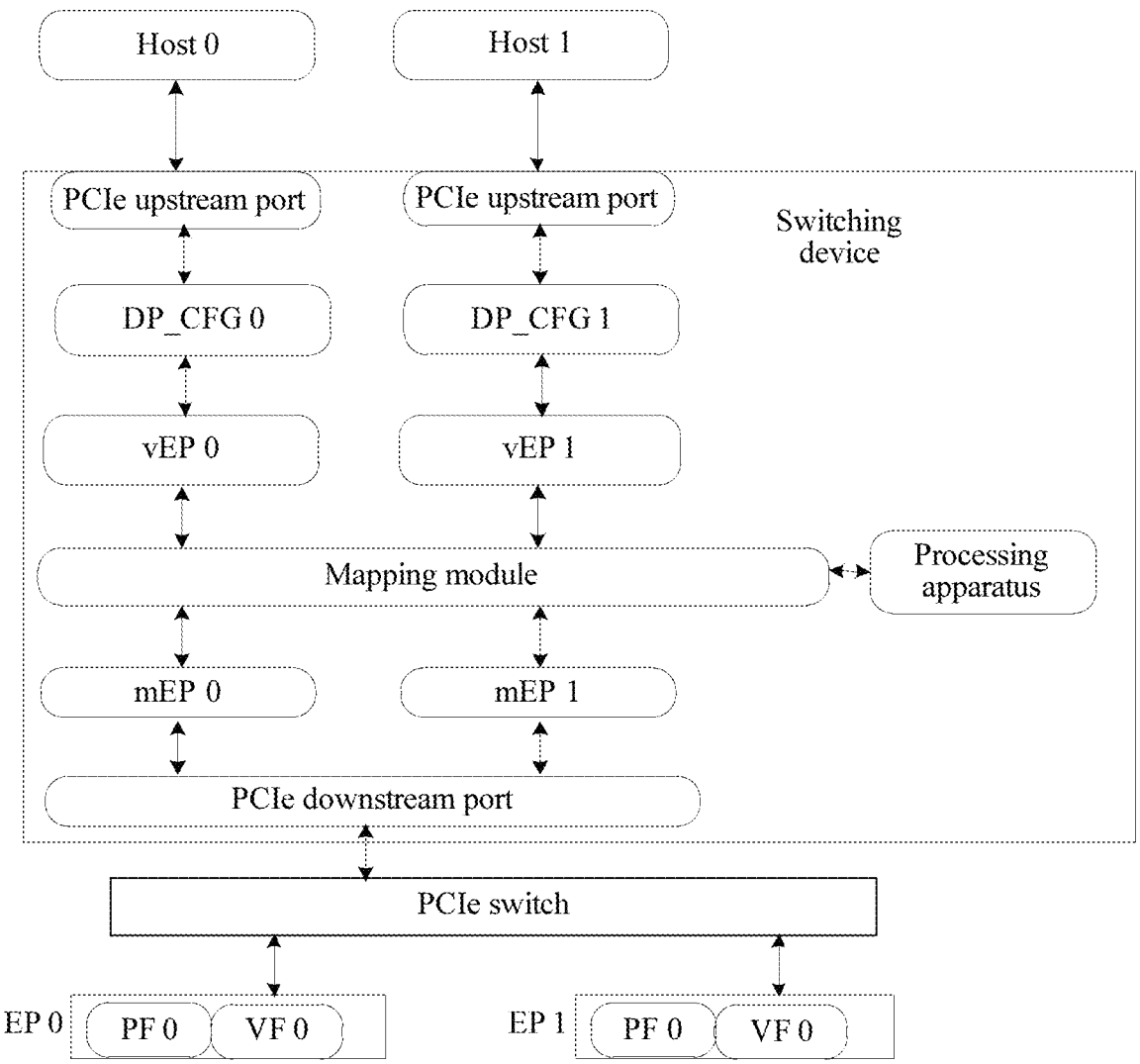
FIG. 4 is another schematic block diagram of a PCIe system according to an embodiment of the present disclosure.

Further, in the VF direct mode, the $N_3$ vEPs 224 are configured to virtualize VFs of the $M_1$ I/O devices 230. For example, as shown in FIG. 4, a PCIe system may include two hosts: a host 0 and a host 1, a PCIe switch, two EP devices: an EP 0 and an EP 1, and a switching device. The switching device includes two PCIe upstream ports respectively connected to the host 0 and the host 1, a PCIe downstream port respectively connected to the EP 0 and the EP 1 using the PCIe switch, PCIe configuration spaces DP_CFG 0 and DP_CFG 1 respectively corresponding to the PCIe downstream port, an internal processing apparatus, a mapping module, a vEP 0, a vEP 1, an mEP 0, and an mEP 1. The vEP 0 is connected to one PCIe upstream port using the DP_CFG 0, and the vEP 1 is connected to the other PCIe upstream port using the DP_CFG 1. Each of the EP 0 and the EP 1 has a PF: a PF 0, and a VF: a VF 0 corresponding to the PF 0. In this case, the vEP 0 may be configured to virtualize the VF 0 of the EP 0 such that the VF 0 is used by the host 0. Further, the vEP 0 may be a combination of PCIe configuration spaces of the PF 0 and the VF 0 of the EP 0.

The vEP 1 may be configured to virtualize the VF 0 of the EP 1 such that the VF 0 is used by the host 1. Further, the vEP 1 may be a combination of PCIe configuration spaces of the PF 0 and the VF 0 of the EP 1. However, this is not limited in this embodiment of the present disclosure.

Optionally, in the VF direct mode, PF drives of the $M_1$ I/O devices 230 may be loaded by the management BMC, and VF drives of the $M_1$ I/O devices 230 may be loaded by processors of the $N_1$ hosts 210. Further, each host 210 may load a VF drive, of an I/O device, 230 virtualized by the vEP 224 that is enumerated by the host 210. However, this is not limited in this embodiment of the present disclosure.

Figure 5:
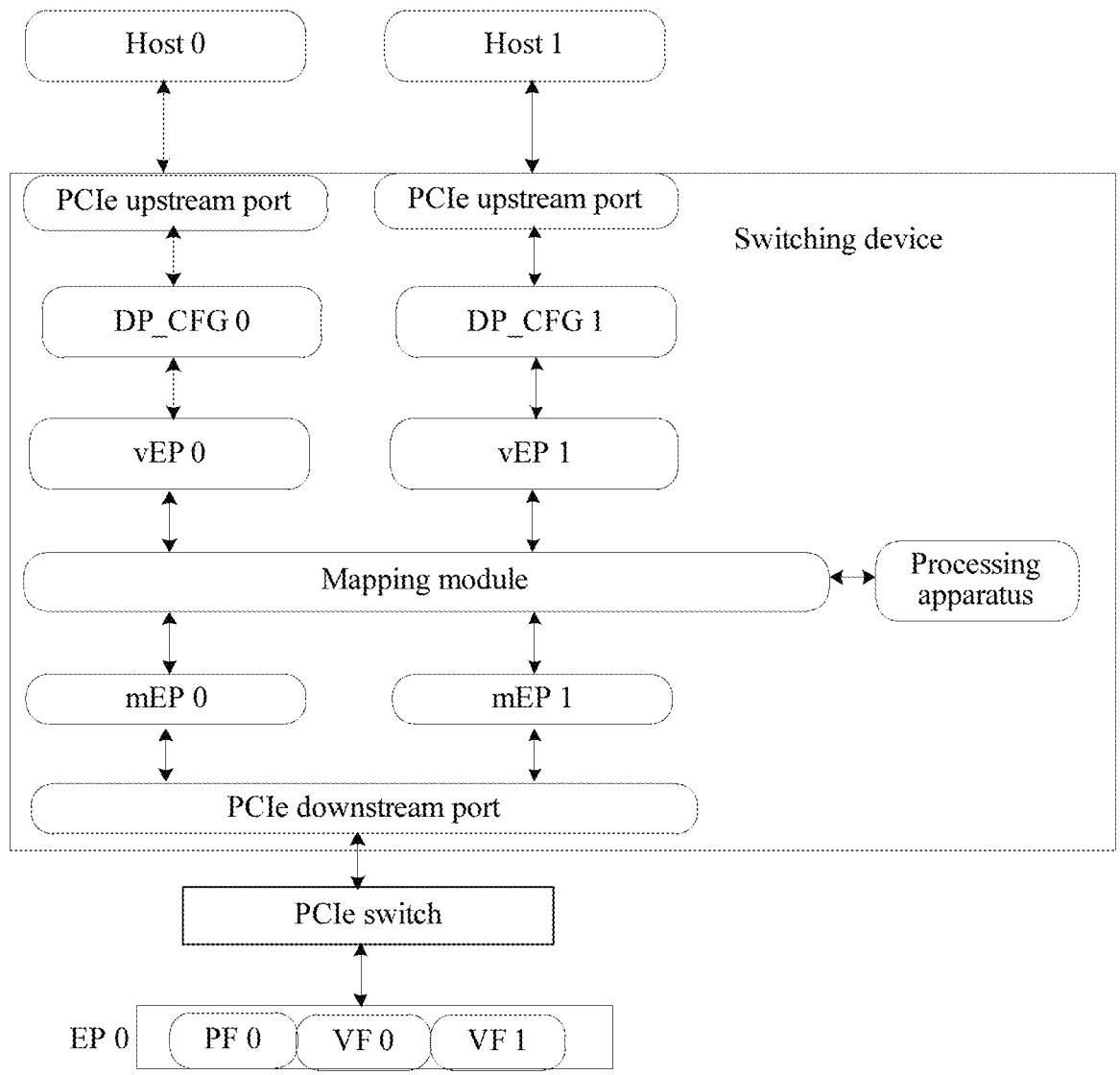
FIG. 5 is another schematic block diagram of a PCIe system according to an embodiment of the present disclosure.

In the VF shared mode, the $N_3$ vEPs 224 are configured to virtualize PFs and VFs of the $M_1$ I/O devices 230. In this case, in the functions virtualized by the vEP 224, only the VF may be used as a service port to be used by the host 210, and the PF cannot be used as a service port to be used by the host 210. Optionally, the vEP 224 may be a PCIe configuration space of a virtualized PF. The PCIe configuration space may include an SR-IOV capability space. However, this is not limited in this embodiment of the present disclosure. For example, as shown in FIG. 5, the PCIe system may include two hosts: a host 0 and a host 1, a PCIe switch, an EP device: an EP 0, and a switching device. The switching device includes two PCIe upstream ports respectively connected to the host 0 and the host 1, a PCIe downstream port connected to the EP 0 using the PCIe switch, two PCIe configuration spaces DP_CFG 0 and DP_CFG 1 corresponding to the PCIe downstream port, an internal processing apparatus, a mapping module, a vEP 0, a vEP 1, an mEP 0, and an mEP 1. The EP 0 has a PF: a PF 0 and two VFs: a VF 0 and a VF 1 corresponding to the PF 0. In this case, the vEP 0 and the vEP 1 may be a PCIe configuration space, of the PF 0, that carries an SR-IOV capability space in order to respectively virtualize the VF 0 and the VF 1. Optionally, in the VF shared mode, the PF drives of the $M_1$ I/O devices 230 may be loaded by the management BMC. Different from the VF direct mode, the processors of the $N_1$ hosts 210 further need to load PF drives corresponding to the $N_3$ vEPs 224, for enabling a VF virtualized by the $N_3$ vEPs 224 such that the $N_1$ hosts 210 can normally use the VF.

Figure 6:
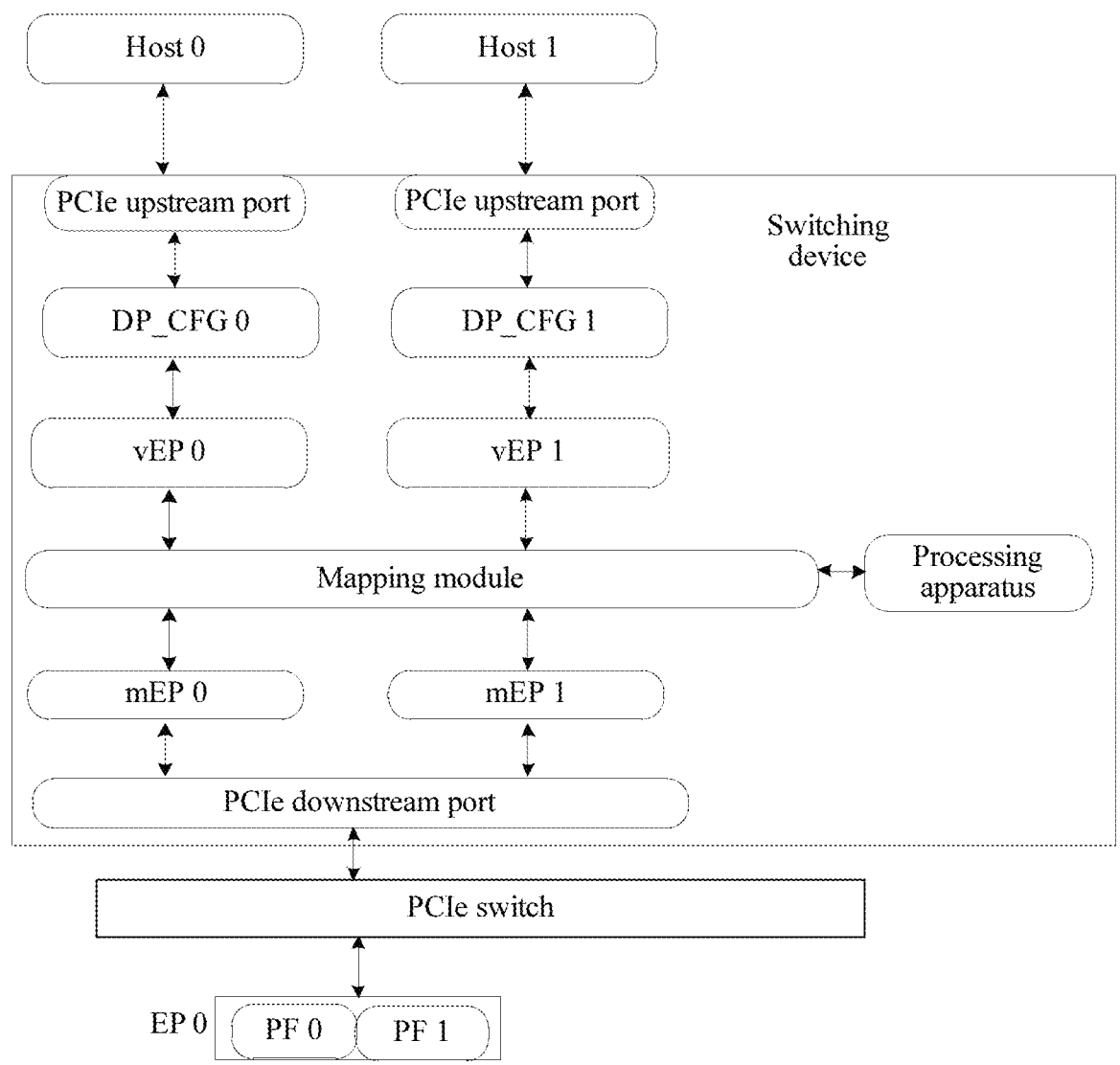
FIG. 6 is another schematic block diagram of a PCIe system according to an embodiment of the present disclosure.

In the PF shared mode, the $N_3$ vEPs 224 may be configured to virtualize PFs of the $M_1$ I/O devices 230. In this case, optionally, the $M_1$ I/O devices 230 may have only a PF and have no VF, that is, the PF in the $M_1$ I/O devices has no VF corresponding to the PF. Optionally, the vEP 224 may be a PCIe configuration space of a PF virtualized by the vEP 224, and the PCIe configuration space may not include an SR-IOV capability space. For example, as shown in FIG. 6, the PCIe system may include two hosts: a host 0 and a host 1, a PCIe switch, an EP device: an EP 0, and a switching device. The switching device includes two PCIe upstream ports respectively connected to the host 0 and the host 1, a PCIe downstream port connected to the EP 0 using the PCIe switch, two PCIe configuration spaces DP_CFG 0 and DP_CFG 1 corresponding to the PCIe downstream port, an internal processing apparatus, a mapping module, a vEP 0, a vEP 1, an mEP 0, and mEP 1. The EP 0 has two PFs: a PF 0 and a PF 1, and has no VF. In this case, the vEP 0 may be configured to virtualize the PF 0 such that the PF 0 is used by the host 1. The vEP 1 may be configured to virtualize the PF 1 such that the PF 1 is used by the host 2. However, this is not limited in this embodiment of the present disclosure. Optionally, in the PF shared mode, the PF drives of the $M_1$ I/O devices 230 may be loaded by the processors of the $N_1$ hosts 210. Further, a processor of each host 210 may load a drive of a PF virtualized by a vEP enumerated by the processor.

Figure 7:
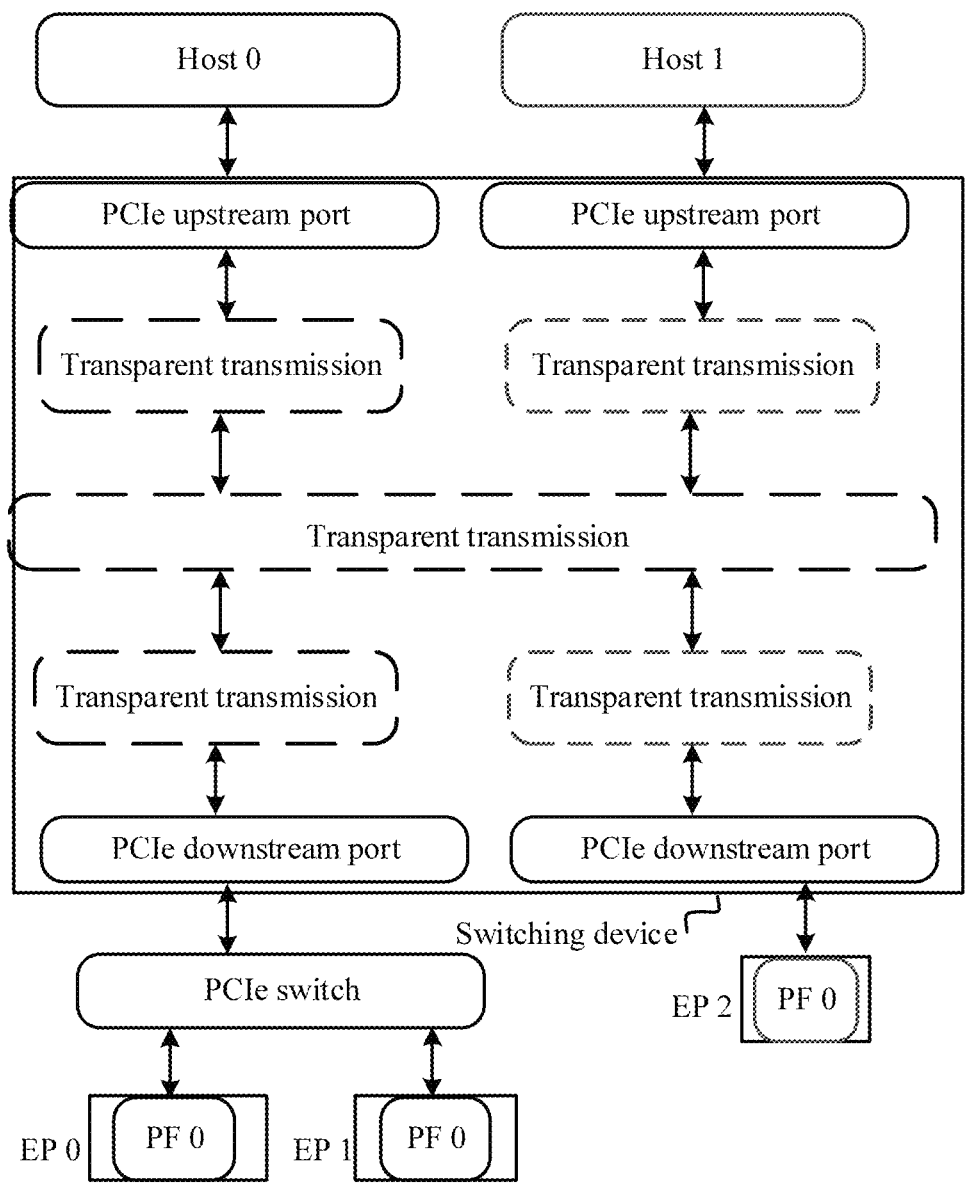
FIG. 7 is another schematic block diagram of a PCIe system according to an embodiment of the present disclosure.

In the EP transparent transmission mode, the switching device 220 may transparently transmit information transmitted between the $M_1$ I/O devices 230 and the $N_1$ hosts 210 that are connected to the switching device 220. In this case, the $M_1$ I/O devices 230 may be a single-function device, that is, have only a PF and have no VF. For example, as shown in FIG. 7, a PCIe system may include two hosts: a host 0 and a host 1, a PCIe switch, three EP devices: an EP 0, an EP 1, and an EP 2, and a switching device. The switching device includes two PCIe upstream ports respectively connected to the host 0 and the host 1, a PCIe downstream port connected to the EP 0 and the EP 1 using the PCIe switch, and a PCIe downstream port directly connected to the EP 2. Each of the EP 0, the EP 1, and the EP 2 has only one PF: a PF 0. The switching device may not store a PCIe configuration space of any PCIe downstream port. In this case, the host 0 may use PFs of the EP 0 and the EP 1. The host 1 may use a PF of the EP 2. All modules in the switching device perform transparent transmission, and cannot implement a function of sharing a same EP by multiple hosts. Optionally, in the EP transparent transmission mode, a VF drive and a PF drive do not need to be loaded.

Optionally, the PCIe system 200 may always operate in a particular one of the foregoing multiple operation modes, or may be switched between the foregoing multiple operation modes. Optionally, the PCIe system 200 may further support another operation mode. This is not limited in this embodiment of the present disclosure.

It should be understood that examples of FIG. 4 to FIG. 7 are intended to help a person skilled in the art better understand this embodiment of the present disclosure, but not to limit the scope of this embodiment of the present disclosure. A person skilled in the art may perform various equivalent modifications or changes according to the provided examples of FIG. 4 to FIG. 7. The modifications or the changes also fall into the scope of this embodiment of the present disclosure.

Figure 8:
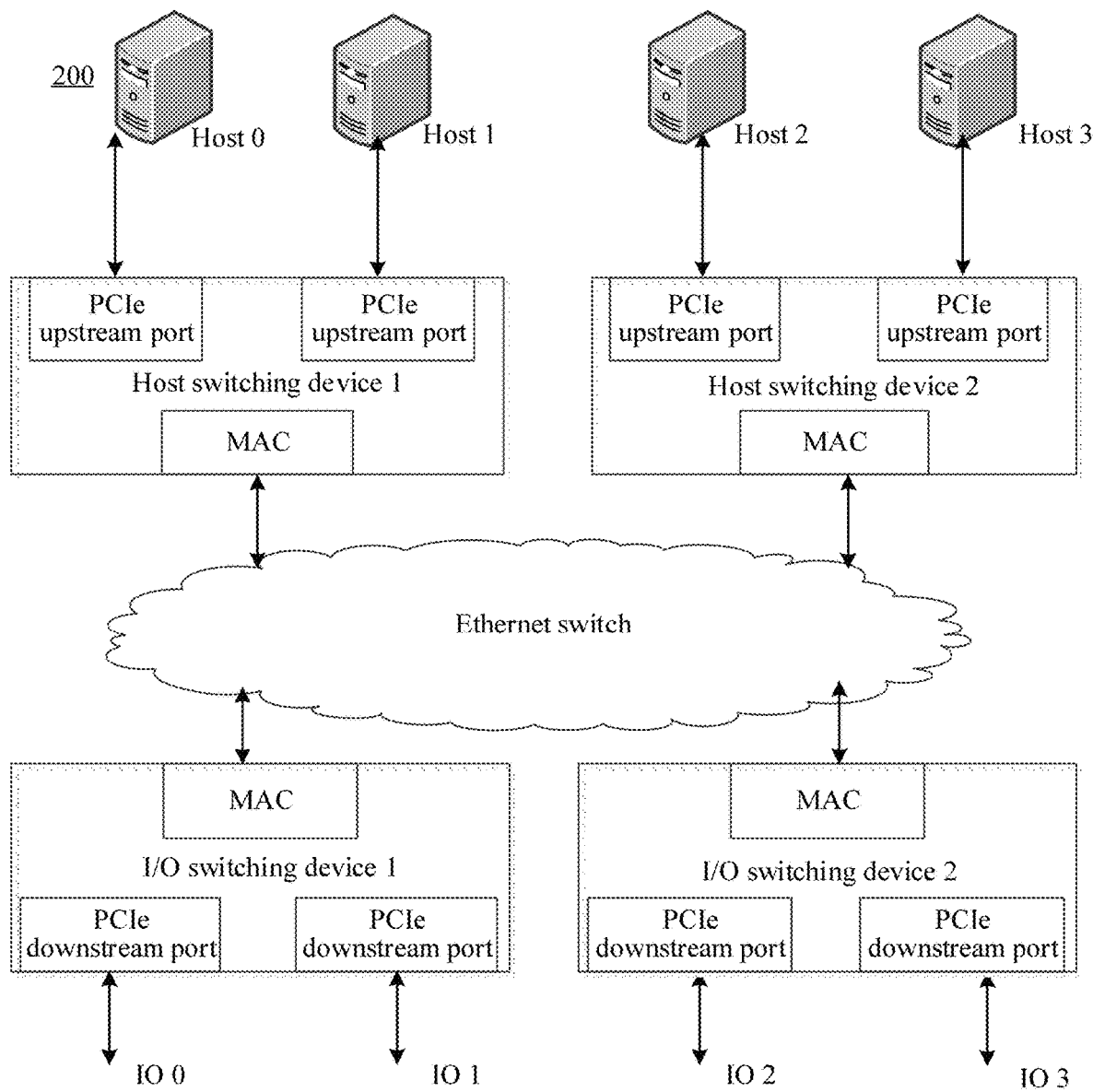
FIG. 8 is another schematic block diagram of a PCIe system according to an embodiment of the present disclosure.

It should be further understood that the examples are all described using an example in which the PCIe system includes one switching device. Optionally, the PCIe system may include multiple switching devices. As shown in FIG. 8, the PCIe system 200 includes two switching devices: a switching device 1 (includes host switching device 1 and I/O switching device 1) and a switching device 2 (includes host switching device 2 and I/O switching device 2). Each switching device may be connected to two hosts and two I/O devices. Further, the switching device 1 may be separately connected to a host 0, a host 1, an IO 0, and an IO 1. The switching device 2 is separately connected to a host 2, a host 3, an IO 2, and an IO 3. In this way, if a switching device has an exception, for example, the switching device 1 connected to the IO 0 and the IO 1 has an exception, exception processing, for example, a reset operation or related service interruption, may be performed according to an actual situation. If the switching device 2 connected to the IO 2 and the IO 3 normally runs, the host 2 and the host 3 can still run normally, thereby enhancing reliability and stability of the system.

Figure 9:
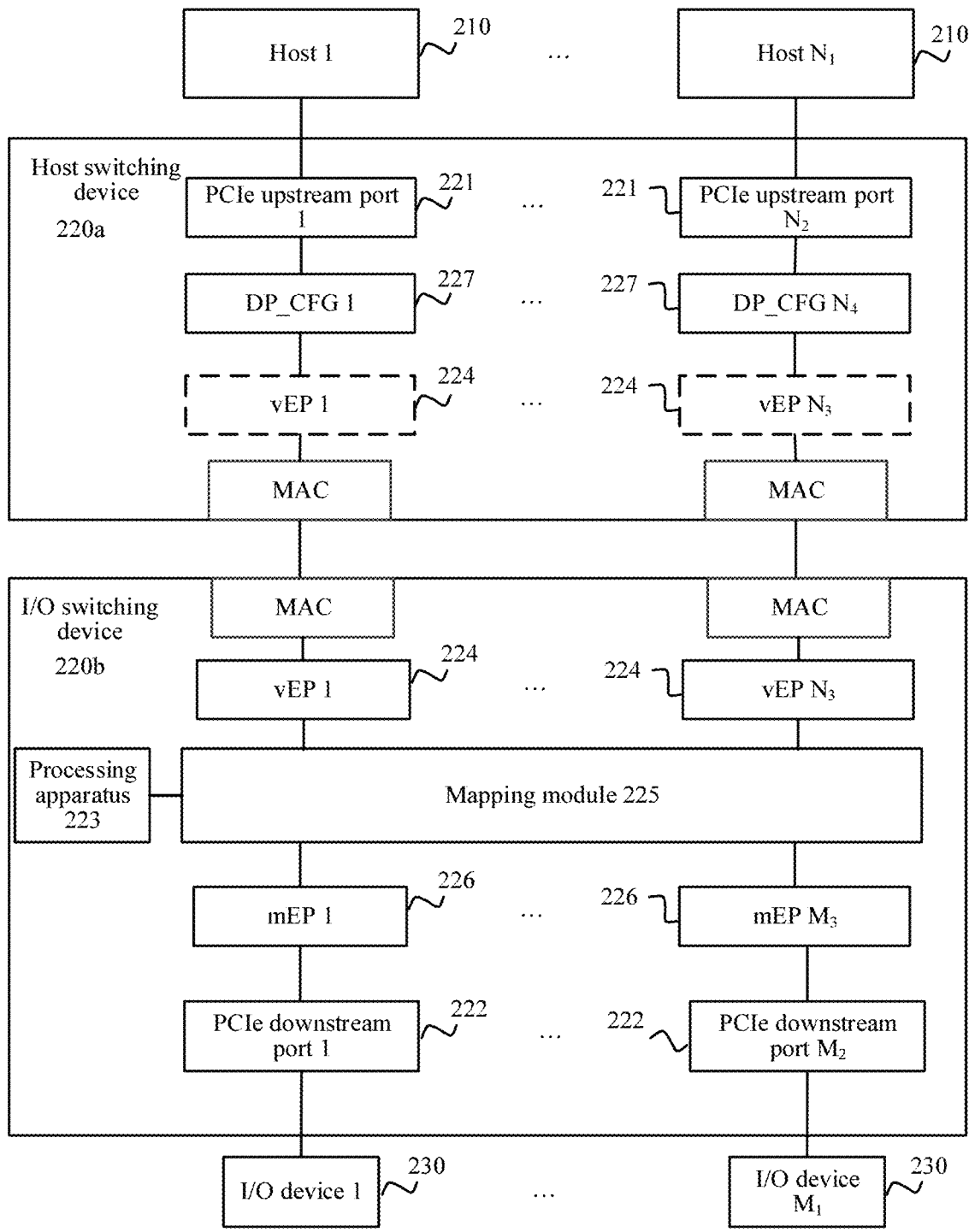
FIG. 9 is another schematic block diagram of a PCIe system according to an embodiment of the present disclosure.

It should be further understood that the foregoing embodiments are all described using an example in which the switching device includes one physical device. Optionally, the switching device may include multiple physical devices. For example, as shown in FIG. 8 and FIG. 9, the switching device may be in an AB-chip form, that is, the switching device may include a host switching device 220*a* and an I/O switching device 220*b*. The host switching device 220*a* and the I/O switching device 220*b* may be connected using an Ethernet interface or a switched interface of another type. In an optional embodiment, the host switching device 220*a* may include $N_2$ PCIe upstream ports 221 and at least one first switched interface that is configured to connect to the I/O switching device 220*b*. The I/O switching device 220*b* may include at least one second switched interface configured to connect to the host switching device 220*a*, an internal processing apparatus 223, and $M_2$ PCIe downstream ports 222. Optionally, as shown in FIG. 9, the at least one first switched interface and the at least one second switched interface may be directly connected. Alternatively, as shown in FIG. 8, the at least one first switched interface and the at least one second switched interface may be connected using an Ethernet switch or an internal switching device of another type. The internal switching device may provide multiple switched interfaces configured to connect the host switching device and the I/O switching device. In this case, the at least one first switched interface may be configured to connect to the internal switching device, and the at least one second switched interface may be configured to connect to the internal switching device. This is not limited in this embodiment of the present disclosure.

In another optional embodiment, the internal processing apparatus 223 may include a processing apparatus (that is, a first processing apparatus) located in the host switching device 220*a* and a processing apparatus (that is, a second processing apparatus) located in the I/O switching device 220*b*. In this case, the first internal processing apparatus may be separately connected to the multiple PCIe upstream ports 221 and the at least one first switched interface using an internal connection line of the host switching device 220*a*. The second internal processing apparatus may be separately connected to the at least one PCIe downstream port 222 and the at least one second switched interface using an internal connection line of the I/O switching device 220*b*. However, this is not limited in this embodiment of the present disclosure.

In this case, optionally, the first internal processing apparatus is configured to receive, using the multiple PCIe upstream ports 221, a first data packet from at least one host 210, process the first data packet to obtain a first data packet on which first processing is performed, and transmit, to the internal switching device using the at least one first switched interface, the first data packet on which first processing is performed.

The second internal processing apparatus is configured to receive, using the at least one second switched interface, the first data packet on which first processing is performed that is transmitted by the internal switching device, process the first data packet on which first processing is performed to obtain a first data packet on which second processing is performed, and transmit, to the at least one I/O device using the at least one PCIe downstream port 222, the first data packet on which second processing is performed.

Optionally, the second internal processing apparatus is further configured to receive, using the at least one PCIe downstream port 222, a second data packet from the at least one I/O device 230, process the second data packet to obtain a second data packet on which first processing is performed, and transmit, to the internal switching device using the at least one second switched interface, the second data packet on which first processing is performed.

The first internal processing apparatus is further configured to receive, using the at least one first switched interface, the second data packet on which first processing is performed that is transmitted by the internal switching device, process the second data packet on which first processing is performed to obtain a second data packet on which second processing is performed, and transmit, to the at least one host using the multiple PCIe upstream ports, the second data packet on which second processing is performed.

Optionally, as shown in FIG. 9, the I/O switching device 220b may further include $N_3$ vEPs 224, a mapping module 225, and $M_3$ mEPs 226. The host switching device 220a may further include $N_4$ pieces of DP_CFG 227 and $N_3$ vEPs 224.

As shown in FIG. 8, a switching device 1 may include a host switching device 1 and an I/O switching device 1, and a switching device 2 may include a host switching device 2 and an I/O switching device 2. The host switching devices and the I/O switching devices are connected using an Ethernet interface (for example, a Media Access Control (MAC) interface). In this case, if the host switching device 1 connected to a host 0 and a host 1 has an exception, the host switching device 1 may be replaced according to an actual situation, but a host 2 and a host 3 can still continue accessing an I/O device, and a service can continue being operated. If the I/O switching device 1 connected to an IO 0 and an IO 1 has an exception, because the I/O switching device 2 connected to an IO 2 and an IO 3 is normal, not only the host 2 and the host 3 can use the IO 2 and the IO 3 using the host switching device 2, an Ethernet switch, and the I/O switching device 2, but also the host 0 and the host 1 can use the IO 2 and the IO 3 using the host switching device 1, the Ethernet switch, and the I/O switching device 2 such that the four hosts can all continue operating the service, thereby further enhancing the reliability and the stability of the system.

Further, as shown in FIG. 8, the host switching device may include the multiple PCIe upstream ports configured to connect to the at least one host. The I/O switching device may include the internal processing apparatus, and the at least one PCIe downstream port configured to connect to the at least one I/O device.

In another optional embodiment, if the switching device includes at least one mEP, a mapping module, and at least one vEP, the at least one mEP, the mapping module, and the at least one vEP may be deployed only in the I/O switching device. Alternatively, as shown in FIG. 9, the host switching device 220a may include at least one vEP 224, and the at least one vEP 224 in the host switching device 220a is the same as at least one vEP 224 in the I/O switching device 220b in a one-to-one correspondence. However, this is not limited in this embodiment of the present disclosure.

It should be understood that "the host switching device" and "the I/O switching device" are merely names for distinguishing different switching devices. Alternatively, "the host switching device" may be referred to as a first switching device, and "the I/O switching device" may be referred to as a second switching device. The names should not constitute any limitation on the protection scope of the embodiments of the present disclosure.

Therefore, the PCIe system 200 provided in this embodiment of the present disclosure includes the at least one host 210, the switching device 220, and the at least one I/O device 230. The switching device 220 includes the multiple PCIe upstream ports 221 configured to connect to the at least one host 210, the at least one PCIe downstream port 222 configured to connect to the at least one I/O device 230, and the internal processing apparatus 223. The processing apparatus 223 is connected to the at least one PCIe downstream port 222 using the internal connection line, and is configured to transmit a configuration read/write packet to the at least one PCIe downstream port 222 using the internal connection line, receive a configuration read/write response packet transmitted by the at least one PCIe downstream port 222 using the internal connection line, and determine, according to a CID carried in the configuration read/write response packet, that the switching device 220 is connected to an I/O device whose identification is the CID. In this way, when the switching device 220 in the PCIe system 200 is faulty, only at least one host 210 and at least one I/O device 230 that are connected to the switching device 220 are affected, and another switching device, and a host 210 and an I/O device 230 that are connected to the other switching device in the system 200 are not affected. Therefore, compared with an external management CPU in the other approaches, stability and reliability of the system can be improved.

In addition, a conventional PCIe technology is mainly applied to a board, and has relatively many limitations, for example, problems such as a limited quantity of PCIe ports of a host, limited space, and poor expansion. A switching device is disposed as two physical devices, and a PCIe domain is borne on the Ethernet for transmission. In this way, limitations of space and distance can be broken through, a PCIe topology can be flexibly set up, an I/O device can be flexibly deployed, and a problem in the other approaches that the PCIe domain cannot be remotely deployed is resolved.

An embodiment of the present disclosure further provides a switching device. The switching device may be as that described in the foregoing system embodiment. For concision, details are not described herein again.

The PCIe system and the switching device provided in the embodiments of the present disclosure are described in detail above with reference to FIG. 2 to FIG. 9. An operation procedure of the PCIe system is described in detail below.

Figure 10:
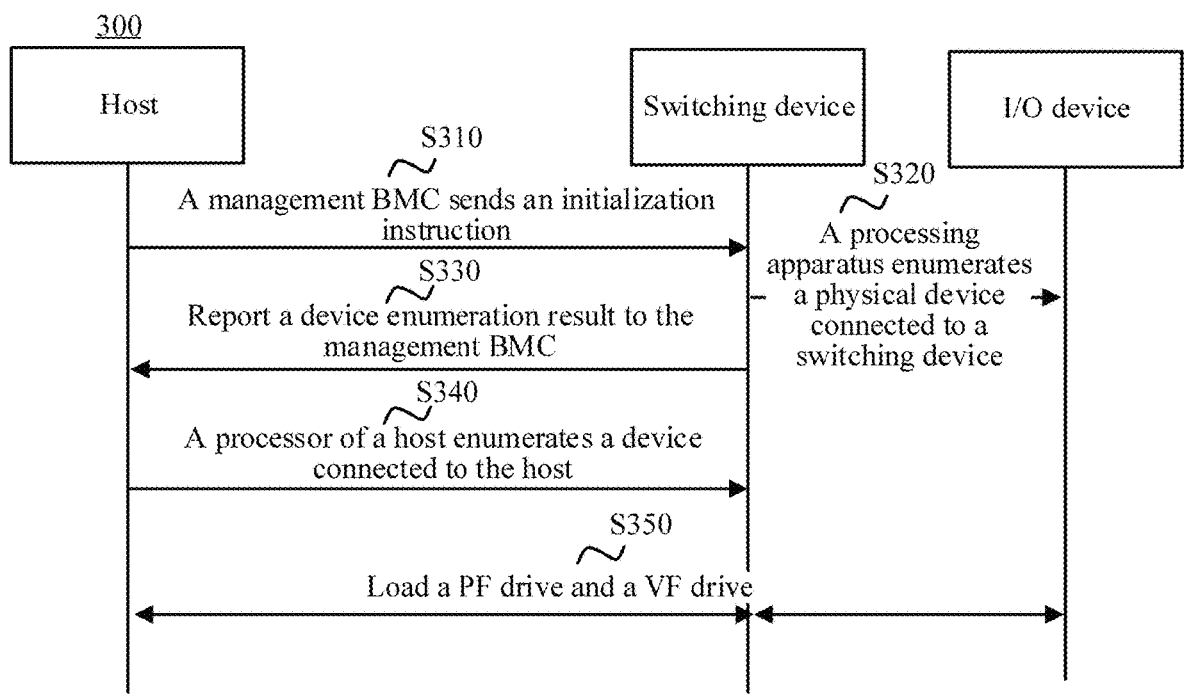
FIG. 10 is a schematic flowchart of a method for initializing a PCIe system according to an embodiment of the present disclosure.

FIG. 10 shows a method 300 for initializing a PCIe system according to an embodiment of the present disclosure. The initialization method 300 may be applied to the PCIe system in the foregoing embodiment.

Step S310: The management BMC (i.e., a host) sends an initialization instruction to the internal processing apparatus in the switching device.

After being powered on, the management BMC may send the initialization instruction to the processing apparatus. The initialization instruction may be used to instruct the processing apparatus to perform an operation, for example, perform device enumeration and/or perform initialization configuration on a module (or a component) in the switching device, related to system initialization.

Step S320: After receiving the initialization instruction, the processing apparatus of the switching device enumerates, according to the initialization instruction, a physical device connected to the switching device using the at least one PCIe downstream port of the switching device, where the physical device includes the at least one I/O device.

In this embodiment of the present disclosure, the management BMC may allocate an identification, for example, allocate a device identifier, to the internal processing apparatus in the switching device. The device identifier may include three fields a bus number, a device number, and a function number. The field of the bus number field indicates a number of a bus on which the device is located, the field of the device number indicates a number of the device, and the field of the function number indicates a number of a function possessed by the device. Usually, the device identifier may also be referred to as a BDF number. Optionally, the device identifier allocated by the management BMC to the processing apparatus may be unique in the system. For example, in an X86 system, the management BMC may allocate 0.0.7 as the device identifier of the processing apparatus. However, this is not limited in this embodiment of the present disclosure.

When performing device enumeration, the processing apparatus may detect a real device connected to the switching device using the at least one PCIe downstream port. Further, the internal processing apparatus may send multiple TLPs to the at least one PCIe downstream port using the internal connection line. The TLP may be a configuration read/write packet, a value of a RID carried in the TLP may be set to a BDF of the processing apparatus, and a CID may be numbered in sequence. When receiving the configuration read/write packet, a PCIe downstream port may forward the received configuration read/write request to a physical device connected to the PCIe downstream port. The physical device may send, according to the received configuration read/write request, a configuration read/write response packet, for example, a CPL packet or a CPLD packet, to the PCIe downstream port connected to the physical device. The configuration read/write response packet may carry the RID and the CID that are in the received configuration read/write packet. In this way, when receiving a configuration read/write response packet using a PCIe downstream port, the processing apparatus may determine that the switching device is connected to a physical device whose BDF number is a CID in the configuration read/write response packet, and may further obtain information that is about the physical device and that is carried in the configuration read/write response packet. However, this is not limited in this embodiment of the present disclosure.

Step S330: The switching device sends, to the management BMC, a device enumeration result of the internal processing apparatus.

The internal processing apparatus may report the device enumeration result to the management BMC using the multiple PCIe upstream ports. The enumeration result may include the physical device connected to the switching device using the at least one PCIe downstream port and a topology structure of the physical device, or may include a PCIe structure tree. This is not limited in this embodiment of the present disclosure.

Step S340: Each of the at least one host enumerates a device connected to each host.

A processor of each of the at least one host may enumerate a device connected to the processor. The device may include a virtual device (that is, a functional module) and/or a physical device, for example, a PCIe upstream port that is of the switching device and that is connected to the host, and at least one vEP. The enumeration may end at the vEP. However, this is not limited in this embodiment of the present disclosure.

A processor of a host may send a configuration read packet, where the configuration read packet ends at a vEP of the switching device. After receiving the configuration read packet, the switching device may return a configuration read response packet to the host using a PCIe upstream port. After receiving the configuration read response packet, the processor of the host may send a configuration write packet to the vEP. Further, the configuration write packet may be used to access a register of the vEP. Optionally, each configuration write packet may access space of 4 KB of the register each time. The configuration write packet still ends at the vEP of the switching device. After receiving the configuration write packet, the vEP of the switching device may forward, using a PCIe downstream port, the configuration write packet to an I/O device corresponding to the vEP (that is, the vEP is configured to virtualize a function of the I/O device). After receiving the configuration write packet, the I/O device corresponding to the vEP may return a configuration write response packet to the switching device using the PCIe downstream port, where the configuration write response packet may carry a BDF number of the I/O device. Optionally, after receiving the configuration write response packet, the mapping module of the switching device may search a second mapping table according to a CID carried in the configuration write response packet, to obtain a BDF number of the vEP corresponding to the configuration write response packet, and may replace the CID in the configuration write response packet with the BDF number of the vEP corresponding to the CID. Then, the mapping module of the switching device may determine, according to a RID carried in the configuration write response packet to send the configuration write response packet to a PCIe upstream port of the switching device, and return the configuration write response packet to the host using the PCIe upstream port.

Optionally, the at least one host and/or the switching device may write, to the vEP and/or the mEP by means of an auto-learning mechanism, information (for example, the BDF number) obtained in the foregoing process of performing enumeration. This is not limited in this embodiment of the present disclosure.

Step S350: The at least one host loads a VF drive and a PF drive of the at least one I/O device.

The VF drive may be loaded by a processor of the host, and the PF drive may be loaded by the processor of the host or the management BMC according to different operation modes.

Further, in a VF direct mode and a VF shared mode, the PF drive of the I/O device may be loaded by the management BMC. In addition, in the VF shared mode, the processor of the host may further load a PF drive of the vEP, that is, a processor of each host may load a PF drive of a vEP enumerated by the processor of the host. In a PF shared mode, the PF drive of the I/O device may be loaded by the processor of the host, that is, a processor of each host may load a PF drive (or a PF drive of a PF virtualized by a vEP) of an I/O device corresponding to a vEP enumerated by the processor of the host. However, this is not limited in this embodiment of the present disclosure.

In another optional embodiment, after step S330, the method 300 may further include the following step.

The internal processing apparatus in the switching device configures a functional module in the switching device. Further, the functional module includes the at least one vEP, the mapping module, and the at least one mEP. In this case, the processing apparatus may establish a mapping relationship between the at least one mEP and the at least one vEP, that is, establish a mapping relationship between a function of the at least one I/O device and a function that is virtualized by the vEP and that can be used by the at least one host. The processing apparatus may store, in the functional module of the switching device, information about a physical device connected to the switching device. For example, the processing apparatus may configure the first mapping table, the second mapping table, and the third mapping table in the foregoing embodiment according to the obtained device information. The information about the physical device may be obtained in a process of performing device enumeration by the processing apparatus. For example, information, for example, a BDF number, about each physical device is obtained from a configuration read/write response packet. Alternatively, the information about the physical device may be delivered by the management BMC. Correspondingly, optionally, before the processing apparatus configures the functional module in the switching device, the method 300 may further include that the management BMC sends configuration management information to the processing apparatus. The configuration management information may include information, for example, a currently used operation mode (for example, any one of the foregoing operation modes), configuration information (for example, a quantity of PCIe configuration spaces corresponding to the PCIe downstream ports, a quantity of vEPs under each PCIe configuration space, a connection relationship between the PCIe downstream port and the I/O device, or a MAC address of each PCIe port) of the PCIe downstream port and the PCIe upstream port, or information about a PCIe configuration space of the I/O device, needed for configuring the functional module of the switching device. However, this is not limited in this embodiment of the present disclosure.

After performing the initialization procedure, the system may operate a service. In this case, for a configuration write packet in a configuration packet sent by the host, the switching device (for example, the mapping module of the switching device) needs to modify a CID in the configuration write packet. For a Mem read/write packet delivered by the host, an address of the Mem read/write packet needs to be modified (for example, base address replacement is performed on addresses corresponding to different domains, and an offset is unchanged). For a completion packet CPLD/CPL sent by the host, only a CID needs to be modified. For a Mem read/write packet sent by the I/O device, a RID of the Mem read/write packet may be modified, and an address does not need to be modified. For a completion packet CPLD/CPL sent by the I/O device, only a CID of the completion packet CPLD/CPL needs to be modified. However, this is not limited in this embodiment of the present disclosure.

It should be understood that, for the initialization method, reference may be made to the specific description of the foregoing system embodiment. For concision, details are not described herein again. In addition, the description of each embodiment of this application emphasizes differences between the embodiment and another embodiment, and similarities between the embodiment and the other embodiment may be used for mutual reference.

It should be understood that sequence numbers of the foregoing processes do not mean a performing order. The performing order of the processes should be determined according to functions and internal logic of the processes, and should not constitute any limitation on an implementation process of this embodiment of the present disclosure.

In addition, an embodiment of the present disclosure further provides a switching system. The switching system includes a first switching device and a second switching device. The first switching device and the second switching device are connected using a network.

The first switching device may include multiple PCIe upstream ports configured to connect to at least one host.

The second switching device may include at least one PCIe downstream port configured to connect to at least one device.

Optionally, the switching system may further include a network switching device located in the network. The network switching device may have multiple switched interfaces configured to connect the first switching device and the second switching device.

In this case, optionally, the first switching device further includes at least one first switched interface configured to connect to the network switching device. The second switching device further includes at least one second switched interface configured to connect to the network switching device.

Optionally, the network switching device may be further an Ethernet switch shown in FIG. 8. However, this is not limited in this embodiment of the present disclosure.

Optionally, the first switching device may be further the host switching device, and the second switching device may be further the I/O switching device. As shown in FIG. 8 and FIG. 9, the host switching device 220a and the I/O switching device 220b may be connected using an Ethernet interface or a switched interface of another type. In an optional embodiment, the host switching device 220a may include $N_2$ PCIe upstream ports 221 and at least one first switched interface that is configured to connect to the I/O switching device 220b. The I/O switching device 220b may include at least one second switched interface configured to connect to the host switching device 220a, an internal processing apparatus 223, and $M_2$ PCIe downstream ports 222.

Optionally, as shown in FIG. 9, the at least one first switched interface and the at least one second switched interface may be directly connected. Alternatively, as shown in FIG. 8, the at least one first switched interface and the at least one second switched interface may be connected using an Ethernet switch or a network switching device of another type. The network switching device may provide multiple switched interfaces configured to connect the host switching device and the I/O switching device. In this case, the at least one first switched interface may be configured to connect to the network switching device, and the at least one second switched interface may be configured to connect to the network switching device. This is not limited in this embodiment of the present disclosure.

In an optional embodiment, the second switching device may be configured to receive a first data packet transmitted by the first switching device using the network, process the first data packet to obtain a second data packet complying with a PCIe protocol, and transmit the second data packet to a target I/O device of the second data packet.

Optionally, the second switching device may be configured to convert the first data packet to the second data packet complying with the PCIe protocol. Optionally, the conversion may include parsing processing, packet format conversion processing, time sequence conversion processing, and the like. However, this is not limited in this embodiment of the present disclosure.

Optionally, the first data packet may be a data packet complying with a network protocol of the network. In an optional embodiment, as shown in FIG. 8, the network may be the Ethernet. In this case, the second switching device may be configured to convert the first data packet complying with an Ethernet protocol to the second data packet complying with the PCIe protocol. However, this is not limited in this embodiment of the present disclosure.

Optionally, the second switching device may be further configured to determine, according to information carried in a received data packet or according to a port configured to receive the data packet, a target device of the data packet, and send the data packet according to the target device of the data packet. For example, the second switching device may further determine, according to information carried in the first data packet, a target I/O device of the first data packet, and send, to the target I/O device of the first data packet, the second data packet that is obtained by processing the first data packet. However, this is not limited in this embodiment of the present disclosure.

Optionally, the first switching device may receive, using the at least one first switched interface, an uplink data packet transmitted by the network switching device, and may transmit a downlink data packet to the network switching device using the at least one first switched interface. For example, the first switching device may transmit the first data packet to the second switching device using the at least one first switched interface. However, this is not limited in this embodiment of the present disclosure.

Optionally, the second switching device may receive, using the at least one second switched interface, a downlink data packet transmitted by the network switching device, and may transmit an uplink data packet to the network switching device using the at least one second switched interface. For example, the second switching device may receive, using the at least one second switched interfaces, the first data packet transmitted by the first switching device. However, this is not limited in this embodiment of the present disclosure.

Optionally, the second switching device further includes a first internal processing apparatus connected to the at least one PCIe downstream port using an internal connection line of the second switching device.

Optionally, that the second switching device is configured to process the first data packet to obtain a second data packet complying with a PCIe protocol includes the first internal processing apparatus is configured to process the first data packet to obtain the second data packet complying with the PCIe protocol.

Optionally, the second switching device may be further configured to process an uplink data packet.

Optionally, a first processing apparatus in the second switching device is configured to receive a third data packet from the at least one I/O device, process the third data packet to obtain a fourth data packet complying with a network protocol of the network, and transmit the fourth data packet to the first switching device using the network.

Optionally, the first processing apparatus may perform conversion processing on a third data packet complying with the PCIe protocol to obtain a fourth data packet complying with the network protocol of the network.

Optionally, the first switching device may process a received uplink data packet and/or downlink data packet.

In another optional embodiment, the internal processing apparatus 223 may include a processing apparatus (that is, a first processing apparatus) located in the host switching device 220*a* and a processing apparatus (that is, a second processing apparatus) located in the I/O switching device 220*b*. In this case, the first internal processing apparatus may be separately connected to the multiple PCIe upstream ports and the at least one first switched interface using an internal connection line of the host switching device. The second internal processing apparatus may be separately connected to the at least one PCIe downstream port and the at least one second switched interface using an internal connection line of the I/O switching device. However, this is not limited in this embodiment of the present disclosure.

Optionally, the first switching device further includes a second internal processing apparatus, connected to the multiple PCIe upstream ports using an internal connection line of the first switching device.

Optionally, the second internal processing apparatus may be configured to process a received uplink/downlink data packet.

In an optional embodiment, the second internal processing apparatus is configured to receive a fifth data packet from the at least one host, process the fifth data packet to obtain the first data packet complying with the network protocol of the network, and transmit the first data packet to the second switching device using the network.

Optionally, the fifth data packet may comply with the PCIe protocol. The second processing apparatus may be configured to convert the fifth data packet to the first data packet, where the first data packet complies with the network protocol of the network.

Optionally, the second processing apparatus may further determine, according to information carried in the fifth data packet and/or a PCIe upstream port receiving the fifth data packet, a first switched interface corresponding to the fifth data packet, and transmit the first data packet to the second switching device using the corresponding first switched interface. However, this is not limited in this embodiment of the present disclosure.

In another optional embodiment, the second internal processing apparatus is configured to receive, using the network, the fourth data packet transmitted by the first switching device, process the fourth data packet to obtain a sixth data packet complying with the PCIe protocol, and transmit the sixth data packet to a target host of the sixth data packet.

Optionally, the second processing apparatus may receive, using the network, a fourth data packet transmitted by the second switching device, where the fourth data packet may be a data packet complying with a network protocol of the network. The second processing apparatus may perform conversion processing on the fourth data packet to obtain the sixth data packet complying with the PCIe protocol.

Optionally, the second processing apparatus may be configured to determine, according to information carried in a received data packet or according to a port configured to receive the data packet, a target device of the data packet, and send the data packet according to the target device of the data packet. For example, the second processing apparatus may determine, according to information carried in the fourth data packet, a target host of the fourth data packet, and transmit, to the target host of the fourth data packet, the sixth data packet that is obtained by processing the fourth data packet. However, this is not limited in this embodiment of the present disclosure.

Optionally, the first switching device further includes at least one virtual EP device module, connected to the multiple PCIe upstream ports, and configured to virtualize a function of the at least one I/O device such that the function is used by the at least one host.

The second switching device further includes at least one mirroring EP device module, connected to the at least one PCIe downstream port, and configured to store PCIe configuration content of the at least one I/O device, and a mapping module configured to implement mapping between a PCIe domain corresponding to the at least one host and a PCIe domain corresponding to the at least one I/O device.

Optionally, none of the at least one PCIe downstream port has any PCIe configuration space, and each of the multiple PCIe upstream ports has a PCIe configuration space.

Optionally, the first switching device further includes at least one PCIe configuration space corresponding to the at least one PCIe downstream port. The at least one virtual EP device module is connected to the multiple PCIe upstream ports using the at least one PCIe configuration space corresponding to the at least one PCIe downstream port.

Optionally, the at least one PCIe configuration space corresponding to the at least one PCIe downstream port may include the $N_4$ pieces of DP_CFG 227. However, this is not limited in this embodiment of the present disclosure.

Optionally, each of the at least one PCIe downstream port may correspond to zero, one, or more PCIe configuration spaces. This is not limited in this embodiment of the present disclosure.

Optionally, the mapping module stores a first mapping table, used to store a mapping relationship from an identification in the PCIe domain corresponding to the at least one host to an identification in the PCIe domain corresponding to the at least one I/O device, and a second mapping table, used to store a mapping relationship from the identification in the PCIe domain corresponding to the at least one I/O device to the identification in the PCIe domain corresponding to the at least one host.

Optionally, a first mirroring EP device module in the at least one mirroring EP device module is a third mapping table, and the third mapping table is used to store a BAR address and a BAR size of a VF of a first I/O device in the at least one I/O device, where the first mirroring EP device module is configured to store PCIe configuration content of the first I/O device.

Optionally, a first virtual EP device module in the at least one virtual EP device module is configured to virtualize a PF of a second I/O device in the at least one I/O device such that the PF is used by a first host in the at least one host, where a PF drive of the second I/O device is loaded by a processor of the first host.

Optionally, a second virtual EP device module in the at least one virtual EP device module is configured to virtualize a VF of a third I/O device in the at least one I/O device such that the VF is used by a second host in the at least one host, where a PF drive of the third I/O device is loaded by a management baseboard management controller BMC in the at least one host.

Optionally, a third virtual EP device module in the at least one virtual EP device module is further configured to virtualize a PF and a VF of a fourth I/O device in the at least one I/O device such that the PF and the VF are used by a third host in the at least one host, where a PF drive of the fourth I/O device is loaded by the management BMC in the at least one host, and a PF drive of the third virtual EP device module is loaded by a processor of the third host.

It should be understood that the at least one virtual EP device module may be the $N_3$ vEPs 224, the at least one mirroring EP device module may be the $M_3$ mEPs 226, and the mapping module may be the mapping module 225. Therefore, for specific implementations of the at least one virtual EP device module, the at least one mirroring EP device module, and the mapping module, refer to the foregoing description. For concision, details are not described herein again.

Optionally, the first switching device may be the host switching device, and the second switching device may be the I/O switching device. For specific implementations of the first switching device and the second switching device, refer to the foregoing description. For concision, details are not described herein again. It should be understood that "the host switching device," "the I/O switching device," "the first switching device," and "the second switching device" herein are merely names for distinguishing different switching devices. The names should not constitute any limitation on the protection scope of the embodiments of the present disclosure.

An embodiment of the present disclosure further provides a PCIe system, including at least one host, the switching system in the foregoing embodiment, and at least one I/O device.

It should be understood that in the embodiments of the present disclosure, the term "multiple" may indicate at least two or three, and the term "and/or" describes only an association relationship for describing associated objects, and represents that three relationships may exist. For example, A and/or B may represent the following three cases Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or may be integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions in the embodiments of the present disclosure.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the other approaches, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of the present application shall be subject to the protection scope of the claims.

What is claimed is:

1. A switching device comprising:
   Peripheral Component Interconnect Express (PCIe) upstream ports configured to couple to a host;
   a PCIe downstream port coupled to the PCIe upstream ports and configured to couple to an input/output (I/O) device;
   an internal connection line; and
   an internal processing apparatus coupled to the PCIe downstream port using the internal connection line and configured to:
      transmit a configuration read/write packet to the PCIe downstream port using the internal connection line,
      receive, from the PCIe downstream port, in response to the configuration read/write packet, and using the internal connection line, a configuration read/write response packet comprising a completer identification, and
      determine, according to the completer identification, that the switching device is coupled to the I/O device whose identification is the completer identification.

2. The switching device of claim 1, wherein the internal processing apparatus is further configured to:
   store PCIe configuration content of the I/O device;
   virtualize a function of the I/O device; and
   implement a mapping between a first PCIe domain corresponding to the host and a second PCIe domain corresponding to the I/O device.

3. The switching device of claim 2, wherein the internal processing apparatus is further configured to store a first mapping relationship from a first identification in the first PCIe domain to a second identification in the second PCIe domain.

4. The switching device of claim 3, wherein the internal processing apparatus is further configured to store a second mapping relationship from the second identification to the first identification.

5. The switching device of claim 4, wherein the switching device is configured to store a mapping table comprising a base address register (BAR) address and a BAR size of a virtual function of the I/O device.

6. The switching device of claim 2, further comprising:
   a host switching device comprising the PCIe upstream ports;
   an Ethernet interface; and
   an I/O switching device coupled to the host switching device via the Ethernet interface and comprising:
      the internal processing apparatus,
      a virtual endpoint device,
      a mirroring endpoint device, and
      the PCIe downstream port.

7. The switching device of claim 1, wherein the internal processing apparatus is further configured to: receive an initialization instruction from a management baseboard management controller (BMC) in the host; and further transmit the configuration read/write packet according to the initialization instruction.

8. The switching device of claim 7, wherein the internal processing apparatus is further configured to report, to the management BMC after the I/O device couples to the switching device, identification information identifying the I/O device.

9. The switching device of claim 1, wherein the internal processing apparatus is further configured to:
   receive configuration management information from a management baseboard management controller (BMC) in the host; and
   configure the PCIe upstream ports and the PCIe downstream port according to the configuration management information.

10. The switching device of claim 1, wherein the internal processing apparatus is further configured to process an exception event and a hot swap event.

11. A Peripheral Component Interconnect Express (PCIe) system comprising:
    a host comprising a management baseboard management controller (BMC), wherein the management BMC comprises a configuration management function;
    an input/output (I/O) device; and
    a switching device comprising:
       Peripheral Component Interconnect Express (PCIe) upstream ports configured to couple to the host;
       a PCIe downstream port coupled to the PCIe upstream ports and configured to couple to the I/O device;
       an internal connection line; and
       an internal processing apparatus coupled to the PCIe downstream port using the internal connection line and configured to:
          transmit a configuration read/write packet to the PCIe downstream port using the internal connection line,
          receive, from the PCIe downstream port, in response to the configuration read/write packet, and using the internal connection line, a configuration read/write response packet comprising a completer identification, and
          determine, according to the completer identification, that the switching device is coupled to the I/O device whose identification is the completer identification.

12. The PCIe system of claim 11, further comprising a PCIe switch, wherein the PCIe downstream port is further configured to further couple to the I/O device using the PCIe switch.

13. The PCIe system of claim 11, further comprising a shelf management module (SMM), wherein the management BMC is configured to send, to the SMM, networking configuration information of the host, the switching device, and the I/O device.

14. A method for initializing a Peripheral Component Interconnect Express (PCIe) system, implemented by the PCIe system, and comprising:
    sending, by a management baseboard management controller (BMC) in a host to an internal processing apparatus in a switching device, an initialization instruction;

determining, by the internal processing apparatus according to the initialization instruction, a first input/output (I/O) device connected to the switching device;

reporting, to the management BMC, first information about the first I/O device;

obtaining, by the host, second information about a second I/O device connected to the host; and loading, by the host according to the second information, a virtual function drive and a physical function drive of the second I/O device.

15. The method of claim 14, further comprising:

sending, by the host, a configuration read packet;

receiving, by a target virtual endpoint device module of the switching device and using a PCIe upstream port of the switching device, the configuration read packet;

sending, by the target virtual endpoint device module, to the host, and according to the configuration read packet, a configuration read response packet; and sending, by the host according to the configuration read response packet, a configuration write packet.

16. The method of claim 15, further comprising:

receiving, by the target virtual endpoint device module, from the host, and using the PCIe upstream port, the configuration write packet;

forwarding, by the target virtual endpoint device module, to a target I/O device, and using a PCIe downstream port of the switching device, the configuration write packet; and receiving, by the target I/O device, from the target virtual endpoint device module, and using the PCIe downstream port, the configuration write packet.

17. The method of claim 16, further comprising:

sending, by the target I/O device, to the switching device, and according to the configuration write packet, a configuration write response packet;

receiving, by the switching device and from the target I/O device, the configuration write response packet;

forwarding, by the switching device, to the host, and using the PCIe upstream port, the configuration write response packet; and obtaining, by the host from the configuration write response packet, information about the target virtual endpoint device module.

18. The method according to claim 17, further comprising:

obtaining, by the internal processing apparatus and from the target virtual endpoint device module, and the information; and configuring, by the internal processing apparatus and according to the information, a mapping module of the switching device.

19. The method of claim 14, further comprising further loading, by the management BMC, a second physical function drive of a third I/O device when a virtual endpoint device module is configured to virtualize a virtual function of the third I/O device.

20. The method of claim 14, further comprising further loading, by a processor of a second host, a physical function drive of a third I/O device when a virtual endpoint device module is configured to virtualize a physical function of the third I/O device.

* * * * *